US011551569B2

(12) United States Patent
Firpo-Triplett et al.

(10) Patent No.: US 11,551,569 B2
(45) Date of Patent: *Jan. 10, 2023

(54) SYSTEM AND METHOD FOR PERSONALIZED RENDERING OF DIGITIZED INSTANCES OF MODELING OF USER IDENTIFIED MICROSKILLS

(71) Applicant: DFUSION, INC., Scotts Valley, CA (US)

(72) Inventors: Regina Marie Firpo-Triplett, Felton, CA (US); Tamara Jean Kuhn, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,658

(22) Filed: Apr. 12, 2021

(65) Prior Publication Data

US 2022/0013024 A1    Jan. 13, 2022

Related U.S. Application Data

(63) Continuation-in-part of application No. 17/224,423, filed on Apr. 7, 2021, which is a continuation-in-part of application No. 15/916,247, filed on Mar. 8, 2018, now Pat. No. 10,977,960, which is a continuation of application No. 62/639,933, filed on Mar. 7, 2018.

(51) Int. Cl.
*G09B 5/06* (2006.01)
*G09B 19/00* (2006.01)
*G06Q 50/20* (2012.01)
*G06Q 30/02* (2012.01)

(52) U.S. Cl.
CPC .......... *G09B 5/065* (2013.01); *G09B 19/003* (2013.01); *G06Q 30/0201* (2013.01); *G06Q 50/2057* (2013.01)

(58) Field of Classification Search
CPC .............................. G09B 5/065; G09B 19/003
See application file for complete search history.

(56) References Cited

U.S. PATENT DOCUMENTS

| 9,031,382 | B1 | 5/2015 | Kaiser et al. |
| 10,977,960 | B2 | 4/2021 | Firpo-Triplett |
| 2003/0195834 | A1 | 10/2003 | Hillis |
| 2008/0254419 | A1 | 10/2008 | Cohen |
| 2009/0035733 | A1 | 2/2009 | Meitar |
| 2009/0162822 | A1* | 6/2009 | Strachan ............. G06F 16/4393 |
| | | | 725/86 |
| 2014/0377732 | A1 | 12/2014 | Freedman |

(Continued)

*Primary Examiner* — Robert J Utama
(74) *Attorney, Agent, or Firm* — Patrick Reilly

(57) ABSTRACT

A system and method for characterizing, selecting, ordering and rendering discrete elements of digitized video content helpful to learn or teach various skills. Each of a plurality of observed or computer-generated instances of modeling of distinguishable skills are recorded as digitized assets. Microskills are identified and deconstructed in the abstract from one or more of the visual and audible recordings of skills modeling moments. Identifiers of microskills are associated by a human editor with recorded modeling instances and/or portions thereof. Modeling presentations are dynamically generated by a user asserting one or more microskill identifiers and a network-enabled selection, ordering and rendering of portions of modeling instances that are associated with the asserted microskill identifiers.

20 Claims, 27 Drawing Sheets

(56) References Cited

U.S. PATENT DOCUMENTS

| | | |
|---|---|---|
| 2015/0004571 A1 | 1/2015 | Ironside |
| 2015/0194064 A1 | 7/2015 | Young |
| 2015/0206441 A1 | 7/2015 | Brown |
| 2016/0049083 A1 | 2/2016 | Brinton |
| 2016/0314704 A1 | 10/2016 | Bell |
| 2020/0357296 A1 | 11/2020 | Sharma |

* cited by examiner

DBS.001

| SES.ID.001 | MDL.ID.001 | MDL.ID.002 |
| --- | --- | --- |
| MDL.ID.010 | MS.ID.001 | MS.ID.004 |
| MS.ID.002 | MS.ID.003 | MS.ID.005 |
| NF.ID.001 | NF.ID.002 | SES.DATA.001 |

SES.REC.001

FIGURE 4

TBL.001

| MS.ID.001 | LBL.001 | TXT.001 |
| MS.ID.002 | LBL.002 | TXT.002 |
| MS.ID.003 | LBL.003 | TXT.003 |
| MS.ID.N | LBL.N | TXT.N |

| | | |
|---|---|---|
| NF.ID.001 | NF.LBL.001 | NF.TXT.001 |
| NF.ID.002 | NF.LBL.002 | NF.TXT.002 |
| NF.ID.003 | NF.LBL.003 | NF.TXT.003 |
| NF.ID.N | NF.LBL.N | NF.TXT.N |

TBL.002

REQ.MSG.001

| LB.ADDR | NET.ADDR | REQ.MSQ.ID.001 | RMSG.DTS.001 |
|---|---|---|---|
| MS.ID.004 | MS.ID.811 | NF.006 | AUD.854 |

FIGURE 8B

SYSTEM AND METHOD FOR PERSONALIZED RENDERING OF DIGITIZED INSTANCES OF MODELING OF USER IDENTIFIED MICROSKILLS

CO-PENDING APPLICATIONS

The present Nonprovisional Patent Application is a Continuation Application of U.S. Provisional Patent Application Ser. No. 62/639,933 titled "SYSTEM AND METHOD FOR PERSONALIZED RENDERING OF DIGITIZED INSTANCES OF MODELING OF USER-IDENTIFIED TEACHING MICROSKILLS" and filed on Mar. 7, 2018. The present Nonprovisional Patent Application claims the priority date of U.S. Provisional Patent Application Ser. No. 62/639,933. Furthermore, U.S. Provisional Patent Application Ser. No. 62/639,933 is hereby incorporated into the present Nonprovisional Patent Application in its entirety and for all purposes.

The present Nonprovisional Patent Application is a Continuation Application of U.S. Nonprovisional patent application Ser. No. 15/916,247 titled "SYSTEM AND METHOD FOR PERSONALIZED RENDERING OF DIGITIZED INSTANCES OF MODELING OF USER-IDENTIFIED TEACHING MICROSKILLS" and filed on Mar. 8, 2018. The present Nonprovisional Patent Application claims the priority date of U.S. Nonprovisional patent application Ser. No. 15/916,247. Furthermore, U.S. Nonprovisional patent application Ser. No. 15/916,247 is hereby incorporated into the present Nonprovisional Patent Application in its entirety and for all purposes.

The present Nonprovisional Patent Application is a Continuation Application of U.S. Nonprovisional patent application Ser. No. 17/224,423 titled "SYSTEM AND METHOD FOR PERSONALIZED RENDERING OF DIGITIZED INSTANCES OF MODELING OF USER-IDENTIFIED MICROSKILLS" and filed on Apr. 7, 2021. The present Nonprovisional Patent Application claims the priority date of U.S. Nonprovisional patent application Ser. No. 17/224,423 Furthermore, U.S. Nonprovisional patent application Ser. No. 17/224,423 is hereby incorporated into the present Nonprovisional Patent Application in its entirety and for all purposes.

FIELD OF THE INVENTION

The present invention is in the field of educational technology and more particularly relates to skills training.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Observing a master craftsperson, artist, athlete, teacher, gardener, musician, or practitioner of any other art or skill practicing their art may be very educational and illuminating to the aspiring future hobbyist or professional. Fortunately, information technology enables the digitized capture of the techniques and methods of experts in any skill. These digitized assets may then be made available for viewing upon demand by prior art methods and means via electronics communications networks. Yet the prior art fails to adequately provide and make accessible this vast technological resource for anybody to learn from easily and productively.

Moreover, the prior art addresses teaching skills in the aggregate and fails to optimally apply a deconstruction of components of pedagogic skills for the object of characterizing and organizing digitized assets for personalized instruction in the field of teaching how to teach.

It is thus an object of the method of the present invention, hereinafter, "the invented method", to provide systems and methods to enable the identification and dynamic organization of digitized recordings of teaching actions to render presentations designed to sequentially present user-selected instances of elements of teaching skills. It is understood that the meaning of the term user as expressed within the present disclosure includes both an intended observer of rendered digital assets and additionally or alternatively a person or information technology process intending to generate presentations to improve teaching capabilities of observers of the rendered digital assets.

SUMMARY AND OBJECTS OF THE INVENTION

Towards these and other objects of the method of the invented method that are made obvious to one of ordinary skill in the art in light of the present disclosure, the invented method identifies components of identified skills and associates the skill components with digitized presentations that model the skill components, i.e., microskills.

A first preferred embodiment of the invented method includes one or more of the aspects of (a.) identifying a plurality of microskills; (b.) assigning a unique microskill identifier to each teaching microskills in a one-to-one correspondence; (c.) digitally recording a plurality of digitized video models, wherein each digitized video model ("video model") records a demonstration of at least one teaching microskills applied in a presentation of at least one information element to an audience; (d.) assigning microskill identifiers to video models that model the associated microskill; (e.) selecting a group of microskill identifiers; (f.) selecting a group of video models that are each associated with at least one microskill identifier of a selected group of microskill identifiers; and/or (g.) rendering a group of video models in a linear sequence in the presence of the human observer as selected on a criteria of specified microskill identifiers.

Additional, alternative and/or optional aspects of certain alternate preferred embodiments of the invented method include, in singularity or in combination, (a.) the rendering the first group of video models is performed by means of user interaction over an electronics communications network; (b.) selecting at least partially in consideration of an audience characteristic assigned to an intended audience associated with the user, wherein the audience characteristic may be partially derived from an experience level parameter, a demographic parameter, and/or a psychographic parameter; (c.) insuring that no two video models of a selected group of video models are assigned a same microskill identifier and/or a same information identifier; (d.) selecting a linear microskills sequence of microskill identifiers and rendering the first group of video models in the linear microskills sequence in the presence of the user; and/or (e.) selecting a sequence of microskill identifiers and rendering the first group of video models in the order of the selected sequence of microskill identifiers.

It is understood that the term "user" as defined and employed herein may include any party who is intending to or intended to learn a skill or microskill, or facilitate the learning of a skill or microskill by another party, or perform a teaching action or performance.

Certain other alternate preferred embodiments of the invented method additionally, alternatively and/or optionally include, in singularity or in combination, one or more of the aspects of (a.) assigning a unique information identifier to each of a plurality of information elements; (b.) assigning at least one information identifier to at least two video models of the plurality of video models; and/or (c.) selecting a sequence of information identifiers and rendering the first group of video models in the order of the selected sequence of information identifiers.

Certain yet other alternate preferred embodiments of the invented method additionally, alternatively and/or optionally include, in singularity or in combination, one or more of the aspects of (a.) associating a related network addresses with the first group of video models, wherein related network address is selectively applied by the user to access additional information; (b.) associating a plurality of related network addresses with the first group of video models, wherein each related network address is selectively applied by the user to access additional information; (c.) rendering at least one selectable representation of at least one related network address simultaneously with the rendering of the first group of video models; (d.) assigning an audience characteristic value to at least one video model and a selecting the first group of video models in a process of matching the audience characteristic value; (e.) assigning a user characteristic value to at least one video model and selecting the first group of video models in a process of matching the user characteristic value.

Certain still other alternate preferred embodiments of the invented method additionally, alternatively and/or optionally include, in singularity or in combination, one or more of the aspects of (a.) assigning a unique information identifier to each of a plurality of information elements; (b.) assigning at least one information identifier to at least two video models of the plurality of video models; (c.) selecting an information identifier; (d.) selecting a third group of video models that are each assigned the selected information identifier; (e.) rendering the third group of video models for observation by the user; and/or (f.) selecting video models of the third group in view of an associated indication of an audience characteristic.

Certain even other alternate preferred embodiments of the invented method additionally, alternatively and/or optionally include, in singularity or in combination, one or more of the aspects of (a.) selecting a first group of information identifiers from a plurality of information identifiers; (b.) selecting a second group of video models, wherein each microskills information identifier of the first group of microskill identifiers is assigned to at least one video model of the second group of video models, and each information identifier of the first group of information identifiers is assigned to at least one video model of the second group of video models; and/or (c.) rendering the second group of video models in a linear sequence in the presence of the user.

Undertaking learning of a new skill or subject of study can be daunting. Even with 'plenty of resources out there' to teach oneself any number of skills and hobbies, it can be tricky to know where to start and how to progress. The anticipated benefits of a preferred embodiment of the present invention may include at least a system providing improved efficiency and enjoyment of teaching oneself something new, by providing step-by-step, microskill-by-microskill video tutorials within a software framework that anticipates what video resources it may benefit the user to show next based on factors such as the user's current skill level, target skill level, age, and watch history. For instance, a new user who would like to take up visual art as a hobby may begin with the very most basic tutorial in drawing and composition, and progress to advanced drawing, or to basic watercolor, or to basic oil painting, or to digital art. The courses may progress differently if the user is already a little skilled, or skilled in one aspect but not another, or if the user sets the goal of attaining a certain specific level of mastery. Regarding that last point, the courses may progress differently based on the user's intended level of mastery because more details at basic levels may become relevant (instead of tangential) if one is shooting for mastery all along. For an example of how this distinction already exists in how material is taught the regular way, consider the difference between a college course on the basics of a subject as taught specifically for majors in that subject, as compared to a course teaching (most of) the same basics to the rest of us.

Further, as a user gains skill in one area, options for what to learn next open up, and branching paths of continuing study emerge, allowing the user to select from any number of areas of learning to pursue next. For instance, someone with an understanding of basic drawing might move on to more advanced drawing, but may also try painting next, or photography, or supplement their learning with some art history, or try drawing/writing comic books. In preferred embodiments, while the user may be guided in appropriate selections of next microskill to learn based on what they currently know and how much mastery in a given area they'd like to develop, that guidance is not so one-sided, and the user also has a variety of approachable and relevant options to choose from, as to what to learn next.

In further preferred embodiments of the invention, the session-building software elements of the invention may be utilized to curate a subsection of all available microskill videos, and load that curated subsection onto a second device. As an example of a situation in which this aspect is applicable, an 'administrator' user such as a teacher might make a subset of available microskill videos available in a curated fashion assisted by the invented technology, to an end user such as a student, on an end user device such as a tablet. This may be a downloaded bundle the student can get from a school website, or a school-owned device that can be checked out like a library book, or any other suitable digital infrastructure. At present, generally, a teacher wishing to make media such as video media available to students may show a movie in class, or assign students to look something up on the internet, with the drawbacks of either spending class time watching movies or hoping the students find the same video material the teacher directs them to instead of something else, respectively. And the latter also assumes that students have internet at home, which, unfortunately, isn't always the case. A curating device for educational video clips, which can be loaded by a teacher then used by a student to watch class-appropriate video material as homework, would be an excellent embodiment and implementation of the invented technology.

Further, in many preferred embodiments of the invented system and method, Artificial Intelligence such as machine learning may be implemented to augment and improve selection and recommendation of content, such as by providing algorithms to provide recommendations based on analysis of patterns of use, analysis of a user's watch history, and even providing recommendations based on the watch histories of other, similar users.

Certain even other alternate preferred embodiments of the method of the present invention comprise downloading to e viewing system a device software that enables the viewing system to instantiate the aspects of the invented method in interaction with the user. Certain even other alternate preferred embodiments of the method of the present invention downloading at least a first plurality of the plurality of video models to an alternate computational system via network.

Yet other additional preferred embodiments of the invented method include one or more of the following aspects: assigning a unique information identifier to each of a plurality of unique information elements in a one-to-one correspondence; selecting a plurality of microskills to be modeled for observation by a user; assigning a unique microskill identifier of a plurality of microskill identifiers to each microskill in a one-to-one correspondence; digitizing a plurality of video models, wherein each digitized video model ("video model") records a demonstration of at least one microskill; assigning at least one user skill level selected from a plurality of user skill levels to each video model; assigning a desired skill level selected from a plurality of desired skill levels to each video model; receiving a user request to select at least one video model, the request including specifying a first microskill identifier, a first user skill level of the plurality of user skill levels and a first desired level of the plurality of skill levels; selecting at least one video model having been assigned the first microskill identifier and both the first user skill level and the first desired skill level; and rendering to the user the at least one video model meeting the selection criteria of having been assigned both the first user skill level and the first desired skill level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 7,827,488 (Sitrick; issued Nov. 2, 2010) titled "Image tracking and substitution system and methodology for audio-visual presentations"; U.S. Pat. No. 7,423,213 (Sitrick; issued Sep. 9, 2008) titled "Multi-dimensional transformation systems and display communication architecture for compositions and derivations thereof"; U.S. Pat. No. 9,911,223 (Song, et al.; issued Mar. 6, 2018) titled "Automatic video segment selection method and apparatus"; and US Patent Appn. Pub. Ser. No. 20160330526 (Marchetti; Marco, et al.; published Nov. 10, 2016) titled "Method and System for Automatically Selecting Parts of a Video and/or Audio Media Content Based on Information Obtained from Social Networks"; U.S. Pat. No. 10,966,062 (Nugumanov, et al., issued Mar. 30, 2021 titled "Complex computing network for improving establishment and broadcasting of audio communication among mobile computing devices"; U.S. Pat. No. 8,402,490 (Hoffberg-Borghesani, et al., issued Mar. 19, 2013) titled "Adaptive pattern recognition based controller apparatus and method and human-factored interface"; U.S. Pat. No. 10,142,276 (Rapaport, et al.; issued on Nov. 27, 2018) titled "Contextually-based automatic service offerings to users of machine system"; U.S. Pat. No. 7,991,764 (Rathod Y. G.; issued on Aug. 2, 2011) titled "Method and system for communication, publishing, searching, sharing and dynamically providing a journal feed" therefore are incorporated herein by reference in their entirety and for all purposes; U.S. Pat. No. 10,867,000 (Ahlstrom, et al., issued Dec. 15, 2020) titled "Recommendation system for providing personalized and mixed content on a user interface based on content and user similarity"; and U.S. Pat. No. 9,232,273 (Begeja, et al., Jan. 5, 2016) titled "System and method for providing program recommendations through multimedia searching based on established viewer preferences".

BRIEF DESCRIPTION OF THE FIGURES

The detailed description of some embodiments of the invention is made below with reference to the accompanying Figures, wherein like numerals represent corresponding parts of the Figures.

FIG. 4 is a block diagram of aspects of a first database of FIG. 1 and FIG. 2 and presenting block diagrams of a first exemplary session record;

FIG. 8B is a block diagram of an exemplary request record as generated by a viewing system of FIG. 1;

DETAILED DESCRIPTION

Figure 1:
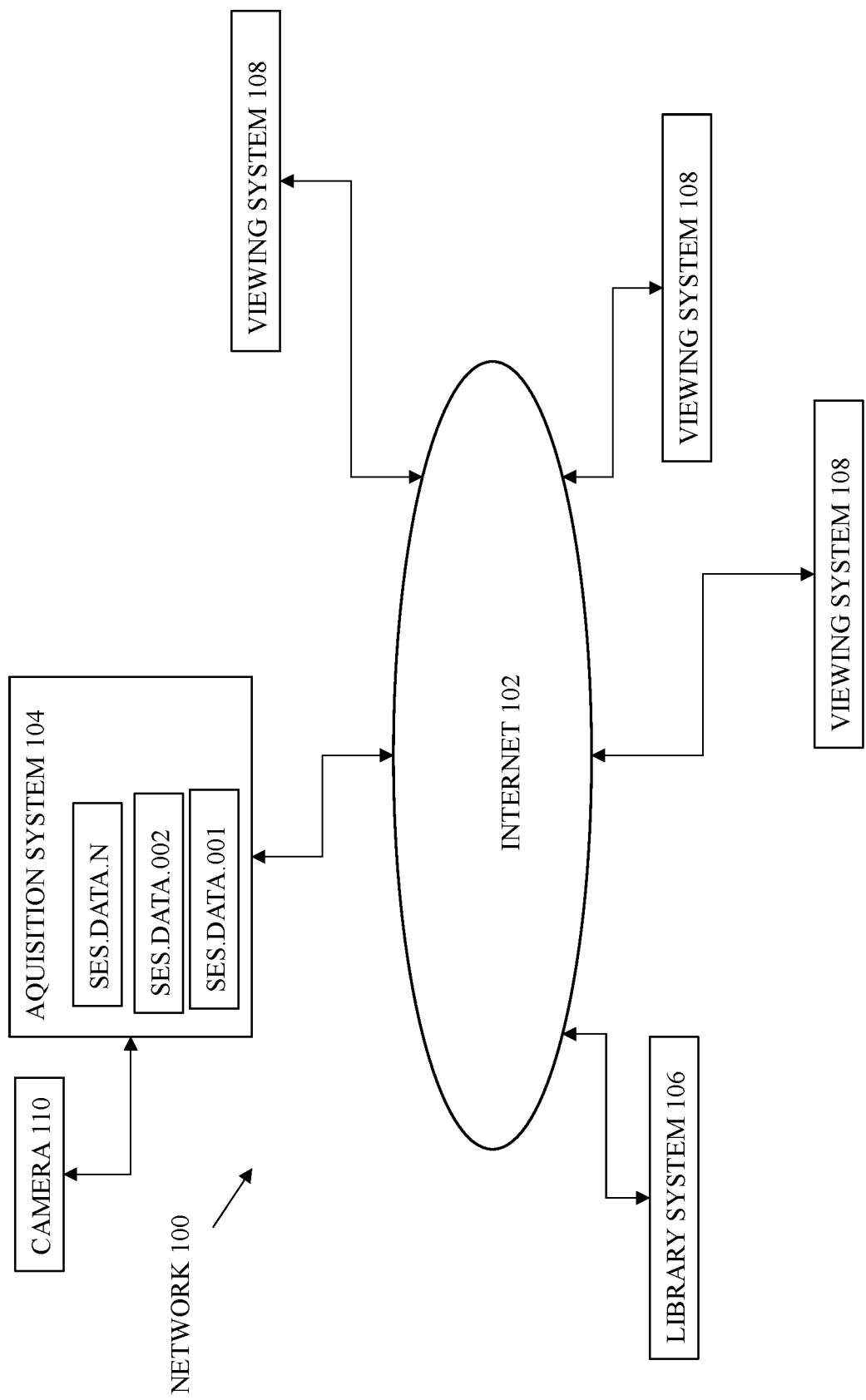
FIG. 1 is a block diagram of an electronic communications network by which the first method is implemented.

All Figures discussed below, and the various embodiments used to describe the principles of the present disclosure in this patent document, are by way of illustration only and should not be construed in any way to limit the scope of the disclosure. Those skilled in the art will understand that the principles of the present disclosure may be implemented in any suitably arranged device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

It is understood that the designator ".N" is applied in the present disclosure to indicate an arbitrarily large quantity of items limited only by the operational capacity of a comprising system, memory or equipment.

Referring now generally to the Figures and particularly to FIG. 1, FIG. 1 is a block diagram of an electronic communications network 100 by which the first method is implemented. The electronic communications network 100 comprises an electronic communications network, such as the Internet 102, a telephony network and/or other digital communications network in singularity or combination. The electronic communications network 100 (hereinafter, "the network" 100) further comprises a modeling session acquisition system 104, a library system 106 and a plurality of viewing systems 108. The network 100 bi-directionally communicatively couples the modeling session acquisition system 104, the library system 106 and the plurality of viewing systems 108.

A digital camera module 110 is communicatively coupled with the acquisition system 104. The digital camera module 110 generates discrete session data SES.DATA.001-SES.DATA.N, wherein each session data SES.DATA.001-SES.DATA.N preferably comprises digitized representations of audible and visual images of teaching sessions or other demonstrations of microskills. Preferably, each recorded microskill memorialized by a session data SES.DATA.001-SES.DATA.N includes an instantiation of one or more microskills. The session data SES.DATA.001-SES.N are received by the acquisition system 104 and thereafter copies of the session data SES.DATA.00-SES.N are transferred via the network 100 from the acquisition system 104 to the library system 106. The session data SES.DATA.00-SES.DATA.N stored in the library system 106 are preferably accessible by each of the viewing systems 108 via the network 106.

The acquisition system 104, the library system 106, and/or one or more viewing systems 108 may be or comprise a bundled hardware and software informational technology product or system including but not limited to (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7 ™ operating system marketed by Microsoft Corporation of Redmond, Wash.; (d.) a MACBOOK PRO™ personal computer as marketed by Apple, Inc. of Cupertino, Calif.; (e.) an IPAD™ tablet computer as marketed by Apple, Inc. of Cupertino, Calif.; (f) an IPHONE™ cellular telephone as marketed by Apple, Inc. of Cupertino, Calif.; (g.) an HTC TITAN II™ cellular telephone as marketed by AT&T, Inc. of Dallas, Tex. and running a WINDOWS 7 ™ operating system as marketed by Microsoft Corporation of Redmond, Wash.; (h.) a GALAXY NEXUS™ smart phone as marketed by Samsung Group of Seoul, Republic of Korea or and running an ANDROID™; (i.) a TOUGHPAD™ tablet computer as marketed by Panasonic Corporation of Kadoma, Osaka, Japan and running an ANDROID™ operating system as marketed by Google, Inc. of Mountain View, Calif.A; or (j.) other suitable mobile electronic device, wireless communications device, tablet computer, smartphone, or computational system or electronic communications device known in the art.

It is understood that the digital camera module 110 may partially or wholly comprised with the acquisition system 104 in various alternate preferred embodiments of the invented method.

Figure 2:
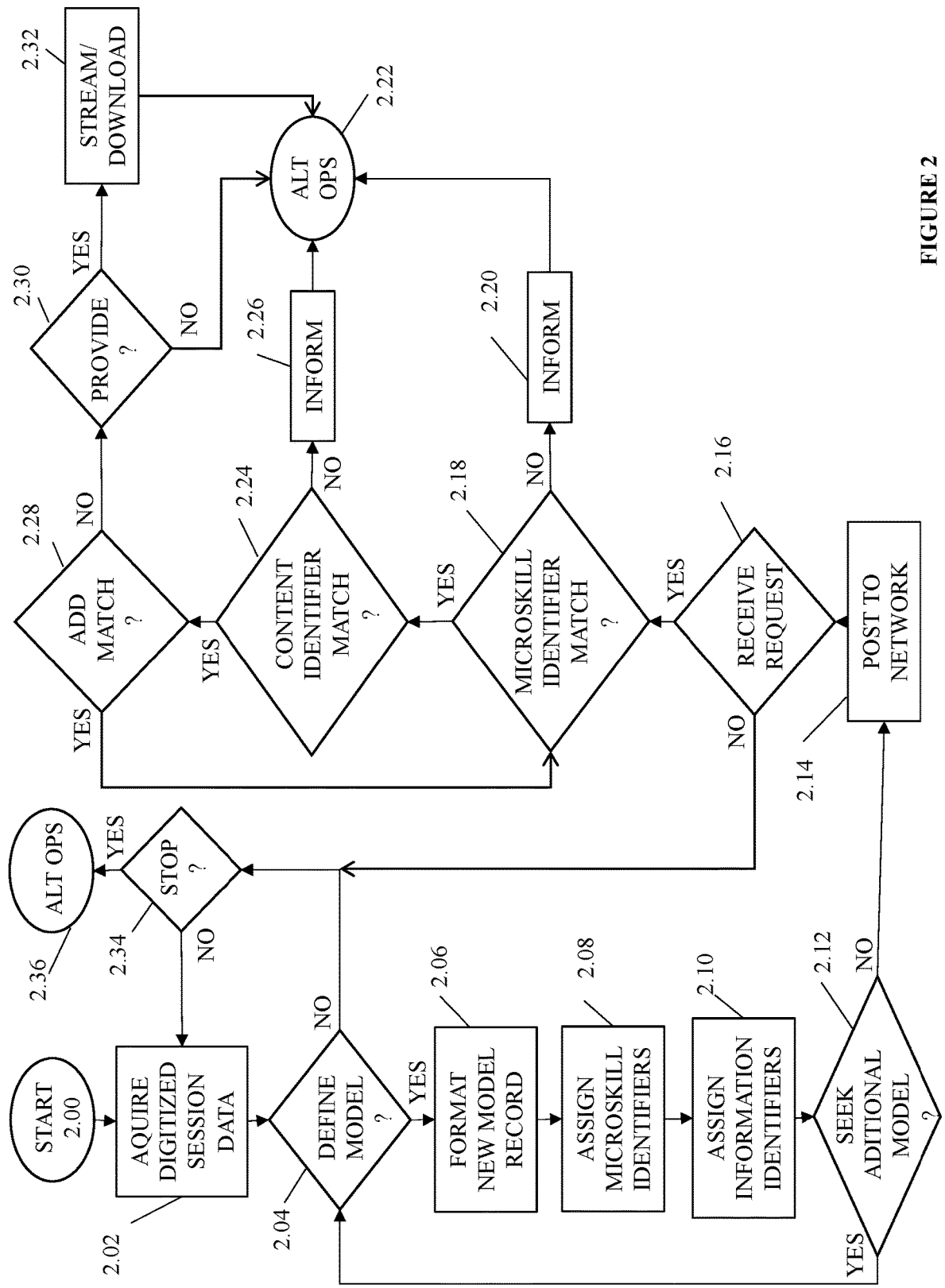
FIG. 2 is a flowchart of the first method as implemented by the library system in concert with the network of FIG. 1.

Referring now generally to the Figures and particularly to FIG. 2, FIG. 2 is a flowchart of the first method as implemented by the library system 106 in concert with the network 100. The library system 106 powers up and boots up in step 2.00 and acquires an exemplary first session data SES.DATA.001 via the network 100 in step 2.02. The library system 106 thereupon within step 2.02 generates a first exemplary session record SES.REC.001 populated with the first session data SES.DATA.001. In step 2.04 the library system 106 determines if a user, hereinafter, "the editor", has identified and defined an exemplary selected first model data MDL.001 selected from the first session data SES.DATA.001. It is understood that the first model data MDL.DATA.001 may alternatively be all or a portion of the first session data SES.DATA.001.

The library system 106 formats an exemplary first model record MDL.REC.001 in step 2.06 and further populates the first model record MDL.REC.001 with both the first model data MDL.DATA.001 and a unique first model record identifier MDL.ID.001. Optionally in step 2.06, the library system 106 also writes the first model record identifier MDL.ID.001 into the first session record SES.REC.001.

As directed by the editor of the library system 106, the library system 106 receives and populates the first model record MDL.REC.001 with one or more microskill identifiers MS.ID.001 & MD.ID.004 in step 2.08, and optionally populates the first session record SES.REC.001 with the one or more received microskill identifiers MDL.ID.001 & MDL.ID.004 if directed by the editor. In optional step 2.10, as directed by the user, the library system 106 receives and populates the first model record MDL.REC.001 with one or more informational content identifiers NF.ID.001 & NF.ID.006, and optionally populates the first session record SES.REC.001 with the one or more informational content identifiers NF.ID.001 & NF.ID.006 as directed by the editor.

The library system 106 is directed by the editor in step 2.12 to either (a.) return to step 2.04 and to define and identify and define additional model data MDL.DATA.002-MDL.N as specified by the editor and thereafter generate additional model records MDL.002-MDL.REC.N that each contain some or all of the first session data SES.DATA.001 in following executions of steps 2.06 through 2.10, or alternatively (b.) proceed from step 2.10 to step 2.14 and post the newly generated model records MDL.REC.001-MDL.REC.N for accessing and rendering via the network 100.

The library system 106 proceeds from step 2.14 to step 2.16 and determines if an access request has been received via the Internet 102. When the library system 106 determines that an access request has been received, the library system 106 proceeds to step 2.18 and determines if the received access request contains a microskill identifier MS.ID.001-MS.ID.N contained within or otherwise associated with any model records MDL.REC.001-MDL.REC.N stored with the library system 106 or accessible by the library system 106 via the network 100. When the library system 106 determines in step 2.18 that the access request received in step 2.16 does not contain even one microskill identifier MS.ID.001-MS.ID.N contained within or otherwise associated with any model records MDL.REC.001-MDL.REC.N accessible to the library system 106, the library system 106 proceeds to step 2.20 and generates and transmits via the network 100 a response message that informs the originator of the access request message of the failure to match a microskill identifier MS.ID.001-MS.ID.N of the access request with any model record MDL.REC.001-MDL.REC.N.

Optionally, alternatively or additionally, the access request may include an indication or identifier of an audience characteristic assigned to an intended audience associated with the user, wherein the audience characteristic may be partially derived from an experience level parameter, a demographic parameter, and/or a psychographic parameter; and the library system 106 proceeds ins steps 2.18 and 2,24 to select model records MDL.REC.001-MDL.REC.N associated with the indication or the identifier of the audience characteristic assigned to the intended audience associated with the user, wherein the audience characteristic may be partially derived from an experience level parameter, a demographic parameter, and/or a psychographic parameter of, or presumed of, the intended audience.

The library system 106 proceeds from step 2.20 to step 2.22 and performs additional computational processes, to include a return to a following execution of step 2.02. In the alternative, when the library system 106 recognizes a match of at least one microskill identifier MS.ID.001-MS.ID.N of the access request with at least one model record MDL.REC.001-MDL.REC.N, the library system 106 proceeds onto execute optional step 2.24.

The library system 106 proceeds in optional 2.24 to determine if the received access request contains one or more informational content identifiers NF.ID.001-NF.ID.N contained within or otherwise associated with the matching model records MDL.REC.001-MDL.REC.N selected in step 2.18. When the library system 106 determines in step 2.24 that the access request received in step 2.16 does not contain the matching model records MDL.REC.001-MDL.REC.N selected in step 2.18, the library system 106 proceeds to step 2.26 and generates and transmits via the network 100 additional alternative response message that informs the originator of the access request message of the failure to match an informational content identifiers NF.ID.001-NF.ID.N of the access request with the model records MDL.REC.001-MDL.REC.N. selected in step 2.18. The library system 106 proceeds from step 2.26 to step 2.22 and performs additional computational processes, to include a return to a following execution of step 2.02. It is understood that in other preferred alternate embodiments of the first method, that the library system 106 proceeds from either step 2.26 or step 2.24 to step.

It is understood that preferably when two or more microskill identifiers MS.ID.001-MS.ID.N are included with the access request message, that the microskill identifiers MS.ID.001-MS.ID.N interpreted by the library system 106 as being in a linear sequence and an attempt to match each microskill identifier MS.ID.001-MS.ID.N of the access request message is sequentially processed through separate instantiations of the loop of step 2.18 through 2.28. In step 2.28 the library system 106 determines if there remains microskill identifier MS.ID.001-MS.ID.N contained within the access request message that has not yet been examined for an attempted match with a model record MDL.REC.001-MD.REC.N in an execution of step 2.18. Optionally or alternatively, the library system 106 may automatically, or as directed by a user, add matches in consideration of an audience characteristic assigned to an intended audience associated instant request of step 2.16, wherein the audience characteristic may be partially derived from an experience level parameter, a demographic parameter, and/or a psychographic parameter.

When the library system 106 determines that there remains at least one microskill identifier MS.ID.001-MS.ID.N of the access request message that has not yet been applied in an attempted match with a model record MDL.REC.001-MD.REC.N, the library system 106 proceeds from step 2.28 and to an additional execution to step 2.18. In the alternative outcome to step 2.28, when the library system 106 determines that each microskill identifier MS.ID.001-MS.ID.N of the access request message that has been applied in an attempted match with a model record MDL.REC.001-MD.REC.N, the library system 106 proceeds to step 2.30 and determines whether to initiate transmission via the network 100 of the model records MDL.REC.001-MD.REC.N selected in the one or more executions of step 2.18 in response to receipt of the access request message detected in step 2.16. When the library system 106 determines in step 2.30 to initiate transmission of the selected model records MDL.REC.001-MDL.REC.N selected in step 2.18 via the network 100, in step 2.32 the library system 106 streams and/or downloads the selected model records MDL.REC.001-MDL.REC.N or alternatively the model data MDL.DATA.001-MDL.DATA.N contained within the selected model records MDL.REC.001-MDL.REC.N. After completion of streaming and/or downloading in step 2.32, the library system 106 proceeds from step 2.32 to step 2.22 and performs alternate computational operations.

In alternative aspects of the first method, when the library system 106 determines in step 2.14 to have not received an access message, the library system 106 proceeds to step 2.34 and determines whether to proceed on to either an additional execution of step 2.02 or to proceed to execute step 2.36 and performs alternate computational operations, to include a return to a following execution of step 2.02.

In additional alternative aspects of the first method, when the library system 106 determines in step 2.04 to not receive direction from the editor to generate a model record MDL.REC.001-MDL.REC.N, the library system 106 proceeds to step 2.34 and determines whether to proceed on to either an additional execution of step 2.02 or to proceed to execute step 2.36 and performs alternate computational operations.

Figure 3:
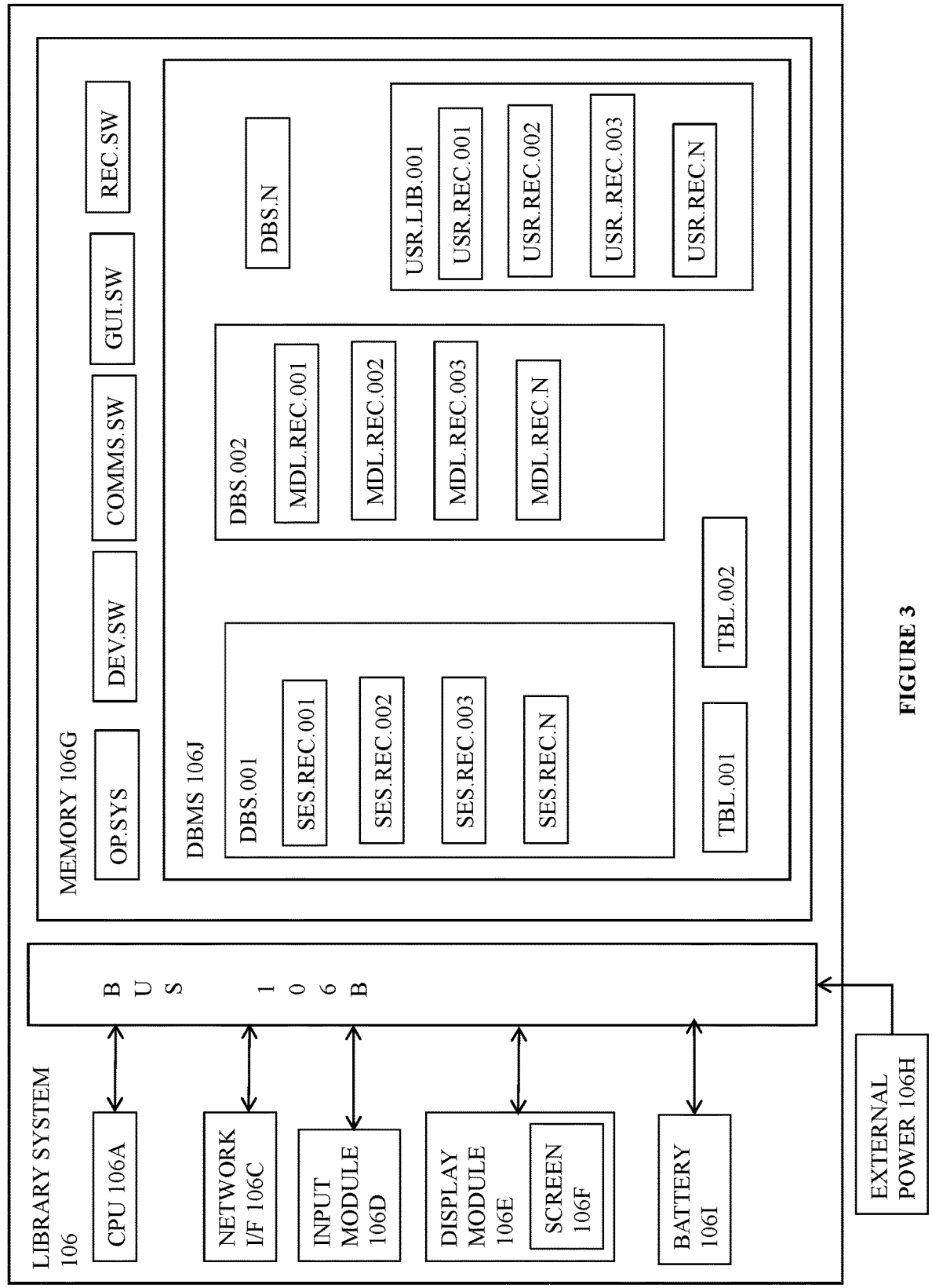
FIG. 3 is a block diagram of aspects of the library system of FIG. 1 and FIG. 2.

Referring now generally to the Figures and particularly to FIG. 3, FIG. 3 is a block diagram of aspects of the library system 106. The library system 106 includes a central processing unit 106A this is bi-directionally communicatively coupled via a power and communications bus 106B to a wireless network communications interface 106C, a user input module, and a video display module 106E having a display screen 106F. The central processing unit 106A (hereinafter, "the CPU" 106A is further communicatively coupled with a system memory 106G via the power and communications bus 106B (hereinafter, "the bus" 106B. Alternatively or additionally an external power source 106H and/or and an electrical power battery 106I provides electrical power via the bus 106B to the CPU 106A, the user input module 106D, the display module 106E, the wireless communications interface 106C, and/or the device memory 106J.

The wireless communications interface 106C bi-directionally communicatively couples the library system 106 with the Internet 102.

The system memory 106J stores an operating system OP.SYS and a device software DEV. SW. The operating system OP. SYS enables the device software DEV. SW to direct the CPU 106A to cause the library system 106 to execute, generate or perform all, or more than one of, the essential aspects, communications and actions required to instantiate the invented method, and alternatively or additionally instantiate the optional aspects of the invented method, in collaboration with the Internet 102, the acquisition system 104 and the plurality of viewing systems 108.

The device memory 106G further preferably stores a graphic user interface software GUI.SW and a communications software COMMS.SW. The graphic user interface software GUI.SW enables the library system 106 to both visually render information via the display screen 106F and receive information and commands from a user or users via the user input module 106D. The communications software COMMS.SW enables the library system 106 to send and receive electronic messages and information to and from the Internet 102 via wireless communications interface 106C. The communications software COMMS.SW additionally or alternatively enables the library system 106 to send and receive electronic messages and information to and from the viewing system 108 by means of the device wireless communications interface 100F in combination with the network 100.

The system memory 106G further stores a data base management system 106J (hereinafter, "the DBMS" 106J). The DBMS 106J may be or comprise an object oriented database management system ("OODBMS"), a relational database management system ("RDBMS") and/or an NoSQL database management system, and one or more databases DBS.001-DBS.N, may be or comprise an object oriented database, a relational database and/or an NoSQL database. More particularly, the DBMS 106G may be or comprise one or more prior art database management systems including, but not limited to, an ORACLE DATABASE™ database management system marketed by Oracle Corporation, of Redwood City, Calif.; a Database 2 ™, also known as DB2 ™, relational database management system as marketed by IBM Corporation of Armonk, N.Y.; a Microsoft SQL Server™ relational database management system as marketed by Microsoft Corporation of Redmond, Wash.; MySQL™ as marketed by Oracle Corporation of Redwood City, Calif.; and a MONGODB™ as marketed by MongoDB, Inc. of New York City, USA; the POSTGRESQL™ open source object-relational database management system; and/or a suitable commercially available NoSQL database.

The first database DBS.001 comprises a plurality of session records SES.REC.001-SES.REC.N and the second database DBS.002 comprises a plurality of model records MDL.REC.001-MDL.REC.N.

The system memory 106G further stores a microskills explanation table TBL.001 and a second table TBL.002. As presented in FIG. 6, the microskills explanation table TBL.001 associates and correlates microskill identifiers MS.ID.001-MS.ID.N with digitized textual microskill labels LBL.001-LBL.N and digitized microskill descriptions TXT.001-TXT.N. As presented in FIG. 7, the second table TBL.002 associates and correlates informational content identifiers NF.ID.001-NF.ID.N with digitized textual informational content labels NF.LBL.001-NF.LBL.N and digitized informational descriptions NF.TXT.001-NF.TXT.N.

The system memory optionally stores a recommendation engine software REC.SW and a first user record library USR.LIB.001. The first user library USR.LIB.001 contains a plurality of user records USR.001-USR.N that includes a first exemplary user record USR.REC.001 and an additional plurality of user records USR.REC.002-USR.REC.N. The utilities and methods of use of the recommendation engine software REC.SW, the first user record library USR.LIB.00, and the plurality of user records USR.REC.001-USR.REC.N are described further within in reference to the Figures and particularly in reference to FIGS. 18, 19 and 20.

Referring now generally to the Figures and particularly to FIG. 4, FIG. 4 is a block diagram of aspects of the first database DBS.001 and presenting block diagrams of an exemplary first session record SES.REC.001. The first session record SES.REC.001 includes a first session record identifier SES.ID.001 three model record identifiers MDLID.001, MDL.IB.002 & MDL.ID.010 associated with the first session record SES.REC.001, a plurality of microskill identifiers MS.ID.001-MS.ID.005 associated with the first session record SES.REC.001, a pair of informational content identifiers associated with the first session record SES.REC.001, and the first session data SES.001.

Figure 5:
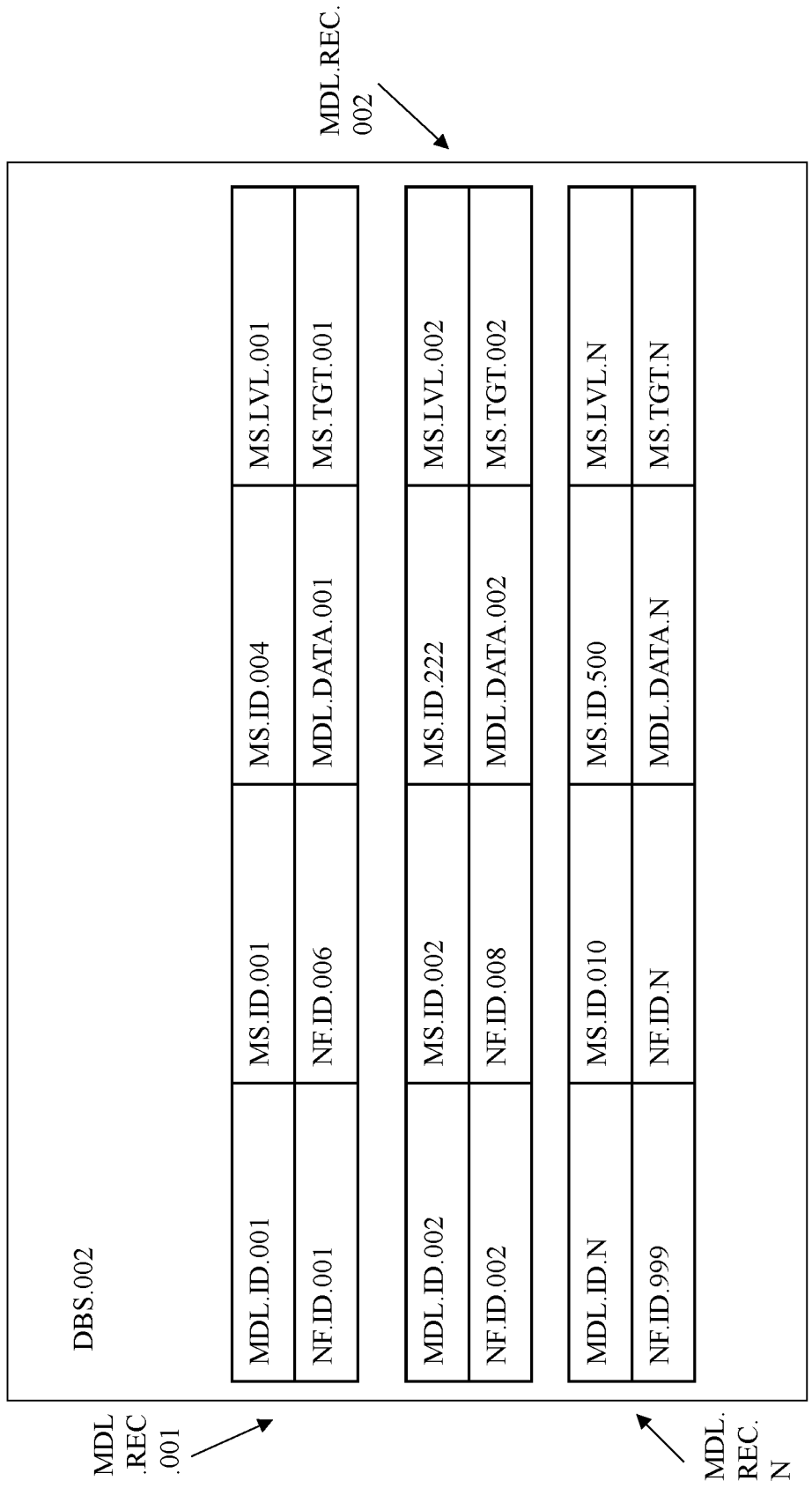
FIG. 5 is a block diagram of aspects of a second database of FIG. 1 and FIG. 2 and presenting block diagrams of exemplary model records.

Referring now generally to the Figures and particularly to FIG. 5, FIG. 5 is a block diagram of aspects of the second database DBS.002 and presenting block diagrams of exemplary model records MDL.REC.001-MDL.REC.N. The exemplary first model record MDL.REC.001 includes a first model record identifier MDL.ID.001, two microskills identifiers MS.ID.001 & MS.ID.004 associated with the first model record MDL.REC.001, two informational content identifiers NF.ID.001 & NF.ID.006 associated with the first model record MDL.REC.001, the first model data MDL.DATA.001, a microskill level tag MS.LVL.001, and a microskill target level tag MS.TGT.001. It is understood that the first model data MDL.DATA.001 is a subset of, or entirely includes, the first session data SES.DATA.001.

An exemplary second model record MDL.REC.002 includes a second model record identifier MDL.ID.002, two microskills identifiers MS.ID.002 & MS.ID.222 associated with the second model record MDL.REC.002, two informational content identifiers NF.ID.002 & NF.ID.008 associated with the associated with the second model record MDL.REC.002, the second model data MDL.DATA.002, a microskill level tag MS.LVL.002, and a microskill target level tag MS.TGT.002. It is understood that the second model data MDL.DATA.002 is a subset of, or entirely includes, a session data SES.DATA.001-SES.DATA.N.

An exemplary Nth model record MDL.REC.N includes an Nth model record identifier MDL.ID.N, two microskills identifiers MS.ID.010 & MS.ID.N associated with the Nth model record MDL.REC.N, two informational content identifiers NF.ID.999 & NF.ID.N associated with the associated with the Nth model record MDL.REC.N, the Nth model data MDL.DATA.N, a microskill level tag MS.LVL.N, and a microskill target level tag MS.TGT.N. It is understood that the Nth model data MDL.DATA.002 is a subset of, or entirely includes, a session data SES.DATA.001-SES.DATA.N.

Figure 6:
FIG. 6 is a block diagram of aspects of a model record identification table record of FIG. 1 and FIG. 2.

Referring now generally to the Figures and particularly to FIG. 6, FIG. 6 is a block diagram of aspects of the microskills explanation table TBL.001. The microskills explanation table TBL.001 associates and correlates microskill identifiers MS.ID.001-MS.ID.N with digitized textual microskill labels LBL.001-LBL.N and digitized textual microskill definitions TXT.001-TXT.N.

To clarify by way of example, a first row of the microskills explanation table TBL.001 associates a first microskill identifier MS.ID.001 with a first digitized microskill label LBL.001 that is a digitization of a human readable character string that identifies a first microskill to a human viewer; the first row of the microskills explanation table TBL.001 also associates the first microskill identifier MS.ID.001 with a first microskill textual definition TXT.001 that is digitization of a human-readable character string that defines the first microskill to a human viewer. A second row of the microskills explanation table TBL.001 associates a second microskill identifier MS.ID.002 with a second microskill label LBL.002 that is digitization of a human-readable character string that identifies a second microskill to a human viewer; the second row of the microskills explanation table TBL.001 further associates the second microskill identifier MS.ID.002 with a digitized second microskill textual definition TXT.002 that is digitization of a human-readable character string that defines the second microskill to a human viewer. A third row of the microskills explanation table TBL.001 associates a third microskill identifier MS.ID.003 with a third microskill label LBL.003 that is digitization of a human-readable character string that identifies a third microskill to a human viewer; the third row of the microskills explanation table TBL.001 further associates the third microskill identifier MS.ID.003 with a digitized third microskill textual definition TXT.003 that is digitization of a human-readable character string that defines the third microskill to a human viewer. An Nth row of the microskills explanation table TBL.001 associates an Nth microskill identifier MS.ID.N with an Nth microskill label LBL.N that is digitization of a human-readable character string that identifies an Nth microskill to a human viewer; the Nth row of the microskills explanation table TBL.001 further associates the Nth microskill identifier MS.ID.N with a digitized Nth microskill textual definition TXT.N that is digitization of a human-readable character string that defines the Nth microskill to a human viewer.

Figure 7:
FIG. 7 is a block diagram of aspects of a table of content references record of FIG. 1 and FIG. 2.

Referring now generally to the Figures and particularly to FIG. 7, FIG. 7 is a block diagram of aspects of the table of content references TBL.002. The second table TBL.002 associates and correlates informational content identifiers NF.ID.001-NF.ID.N with digitized textual informational content labels NF.LBL.001-NF.LBL.N and digitized informational descriptions NF.TXT.001-NF.TXT.N. To clarify by way of example, a first row of the table of content references TBL.002 associates a first informational content 1 identifier NF.ID.001 with a first digitized informational content label NF.LBL.001 that is a digitization of a human readable character string that identifies a first informational content to a human viewer; the first row of the table of content references TBL.002 also associates the first informational content identifier NF.ID.001 with a first informational content textual definition NF.TXT.001 that is digitization of a human-readable character string that defines the first informational content to a human viewer. A second row of the table of content references TBL.002 associates a second informational content 1 identifier NF.ID.002 with a second digitized informational content label NF.LBL.002 that is a digitization of a human readable character string that identifies a second informational content to a human viewer; the second row of the table of content references TBL.002 also associates the second informational content identifier NF.ID.002 with a second informational content textual definition NF.TXT.002 that is digitization of a human-readable character string that defines the second informational content to a human viewer. A third row of the table of content references TBL.002 associates a third informational content 1 identifier NF.ID.003 with a third digitized informational content label NF.LBL.003 that is a digitization of a human readable character string that identifies a third informational content to a human viewer; the third row of the table of content references TBL.002 also associates the third informational content identifier NF.ID.003 with a third informational content textual definition NF.TXT.003 that is digitization of a human-readable character string that defines the third informational content to a human viewer. An Nth row of the table of content references TBL.002 associates an Nth informational content 1 identifier NF.ID.N with an Nth digitized informational content label NF.LBL.N that is a digitization of a human readable character string that identifies an Nth informational content to a human viewer; the Nth row of the table of content references TBL.002 also associates the Nth informational content identifier NF.ID.N with an Nth informational content textual definition NF.TXT.N that is digitization of a human-readable character string that defines the Nth informational content to a human viewer.

Figure 8A:
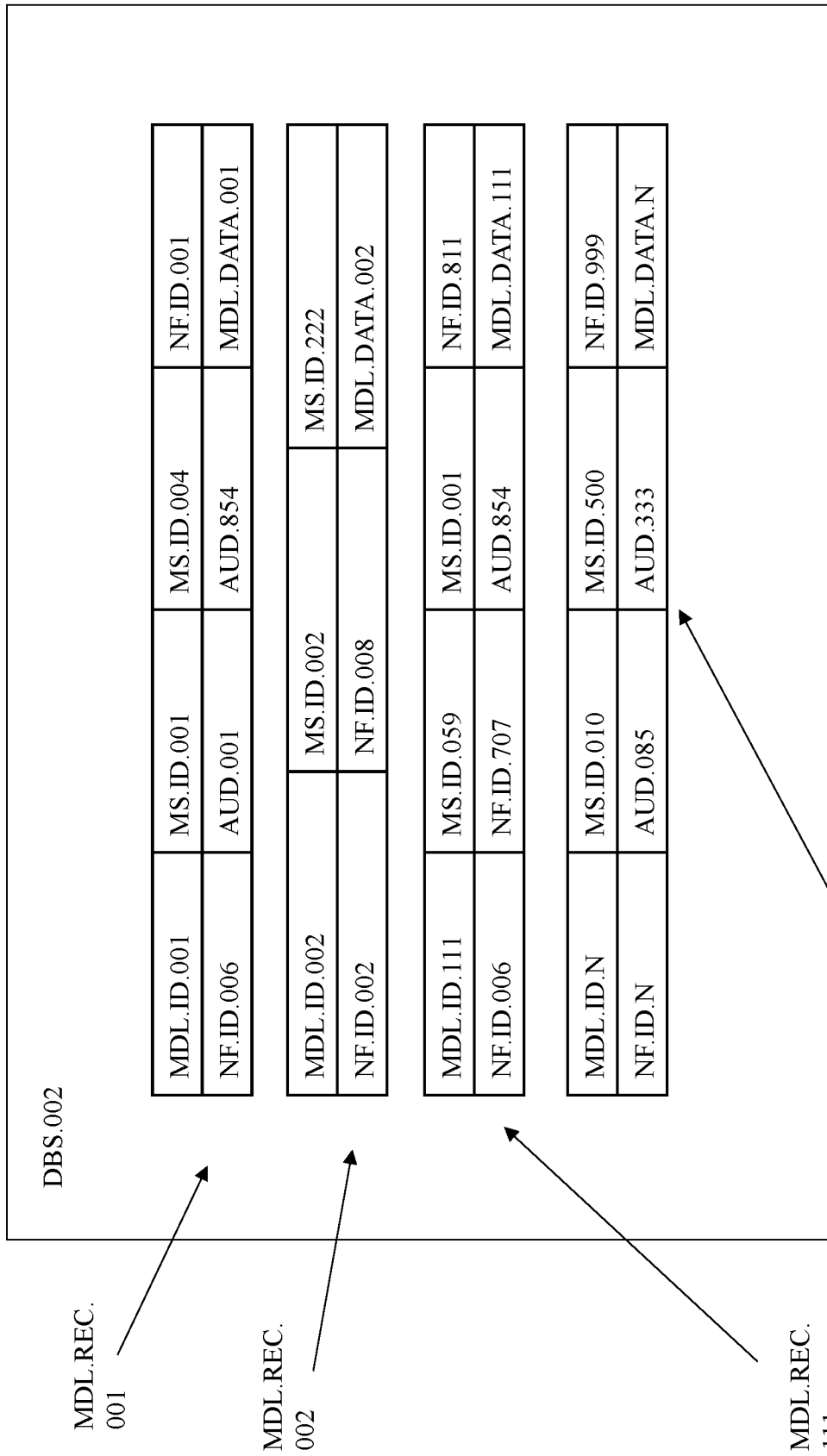
FIG. 8A is a block diagram of expanded exemplary model records of FIG. 5 maintained in a server or device of FIG. 1 or bi-directionally communicatively with the network of FIG. 1, wherein one or more additional characteristics associated with exemplary model records, such as a quality of a user who is intended to view a selected video, a quality of audience members who are intended to be taught by the user, a psychographic parameter associated with said audience and/or said user, a demographic parameter associated with said audience and/or said user, and/or an experience level associated with said audience and/or said user.

Referring now generally to the Figures and particularly to FIG. 8A, FIG. 8A is a block diagram of expanded exemplary model records MDL.REC.001-MDL.REC.N maintained in a second database DBS.002 of a system 104, 106 & 108 of FIG. 1 suitable system, server or device known in the preferably, but not necessarily, bi-directionally communicatively with the network of FIG. 1.

One or more additional characteristic identifiers AUD.001-AUD.N individually associated with one or more exemplary model records MDL.REC.001-MDL.REC.N are presented in FIG. 8A. These additional characteristics separately indicated or represented by one or more additional characteristic identifiers AUD.001-AUD.N may be or comprise (a.) a quality of a user who is intended to view rendering of one or more model data MDL.DATA.001-MDL.DATA.N, (b.) a quality of audience members who are intended to be taught by said user, a psychographic parameter associated with said audience and/or said user, a demographic parameter associated with said audience and/or said user, and/or an experience level associated with said audience and/or said user.

FIG. 8A shows the first model record MDL.REC.001 to additionally include the first digitized video and audio model data MDL.DATA.001, a first characteristic identifier AUD.001, and an $854^{th}$ characteristic identifier AUD.854. FIG. 8A additionally shows an 111th model record MDL.REC.111 to additionally include a $111^{th}$ digitized video and audio model data MDL.DATA.111, an $811^{th}$ microskill identifier MS.ID.811 and the $854^{th}$ characteristic identifier AUD.854. FIG. 8A yet additionally shows the Nth model record MDL.REC.N to include the Nth digitized video and audio model data MDL.DATA.N, an $85^{th}$ characteristic identifier AUD.085, and a 333rd characteristic identifier AUD.333.

Referring now generally to the Figures and particularly to FIG. 8B, FIG. 8B is a block diagram of an exemplary first request message REQ.MSG.001 as generated by the viewing system 108. The first request message REQ.MSG.001 includes a library network address LB.ADDR of the library system as a destination address, a viewing system network address NT.ADDR as the sender address, a first request message identifier REQ.MSG.ID.001, a first request message date time stamp RDTS.001 that indicates a time of origin of the comprising first request message REQ.MSG.001, a fourth microskill identifier MS.ID.004, a $811^{th}$ microskill identifier MS.ID.811 and the $854^{th}$ characteristic identifier AUD.854.

Figure 8C:
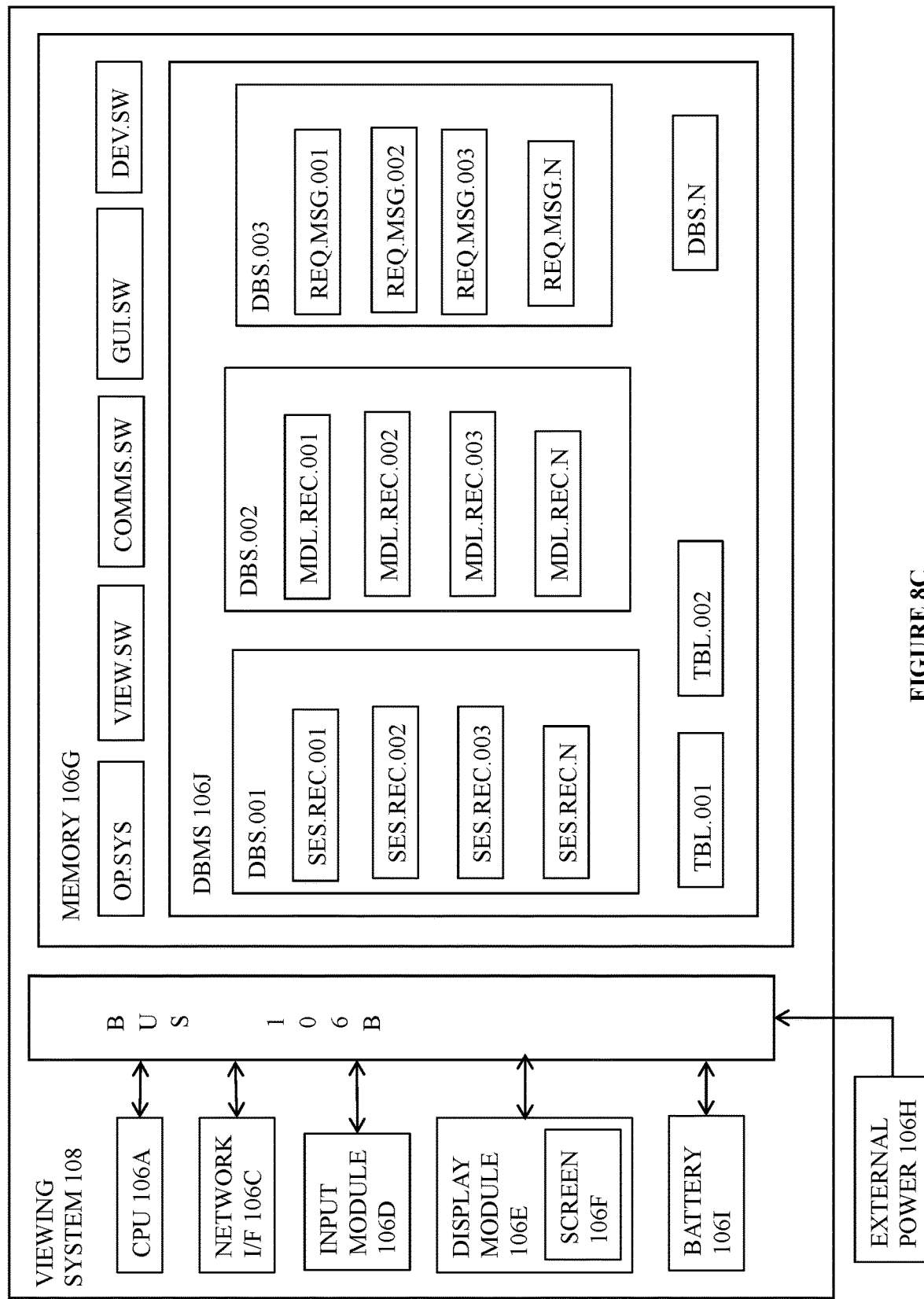
FIG. 8C is a block diagram of an exemplary viewing system of FIG. 1.

Referring now generally to the Figures and particularly to FIG. 8C, FIG. 8C is a block diagram of an exemplary viewing system 108. The viewing system 108 includes some or all elements and aspects of the library system 106 and further includes a viewing system software view that enables and directs the viewing system 108 to execute and perform one or more all of the relevant aspects of the invented method. The viewing system 108 further optionally includes a third database DBS.003 that stores a plurality of request messages REQ.MSG.001-REQ.MSG.N.

It is understood that the viewing system 108 may be or comprise, in whole or in part, one or more library systems 106 and/or one or more acquisition systems 104. It is further understood the acquisition system 104, in whole or in part, may be or comprise one or more library systems 106 and/or one or more viewing systems 108.

Figure 9:
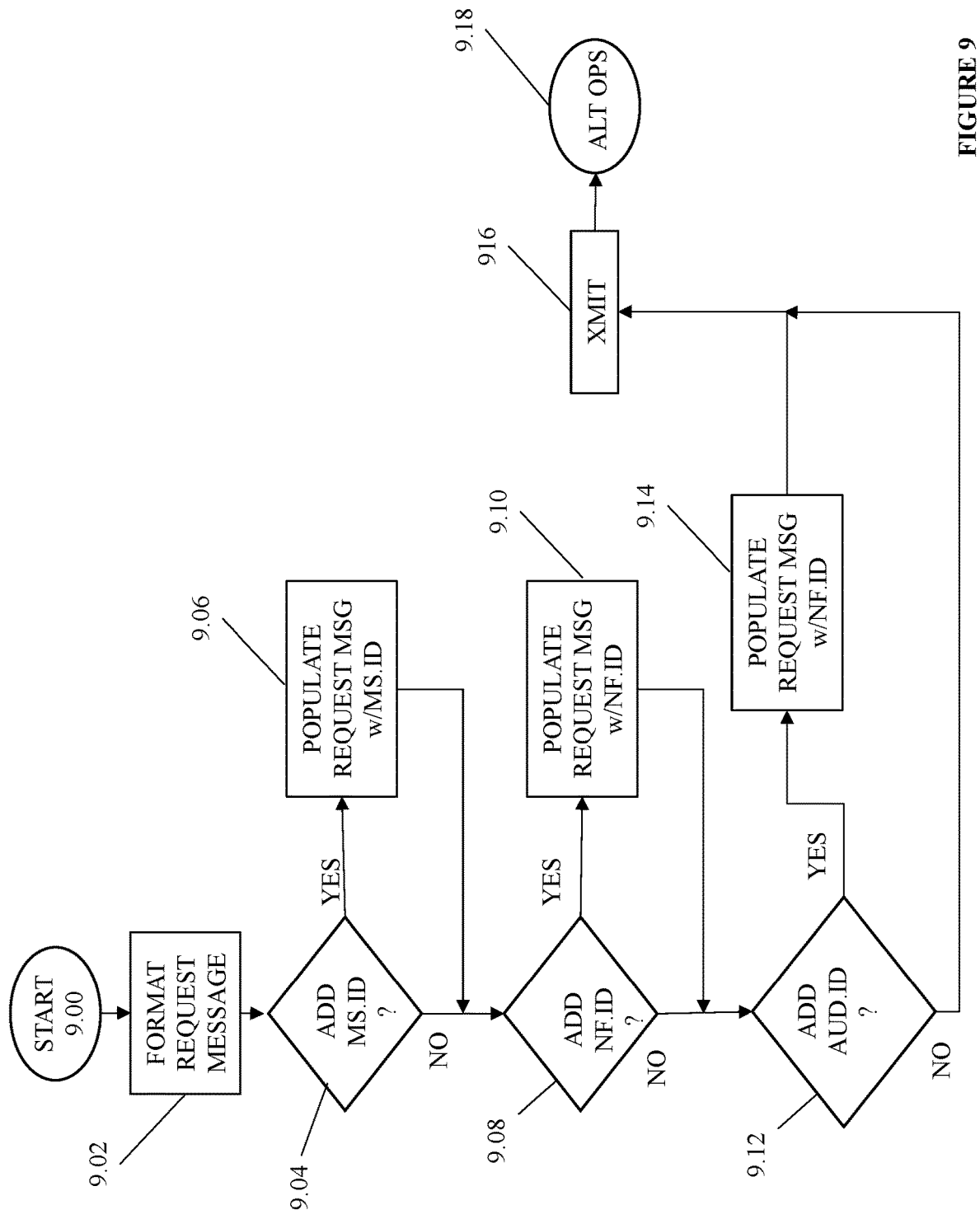
FIG. 9 is a flowchart of a generation of a request record of FIG. 8B.

Referring now generally to the Figures and particularly to FIG. 9, FIG. 9 is a flowchart of a generation of the first exemplary request message of FIG. 8B. In step For purposes of clarity of explanation and not offered as an expression of limitation of the scope of the invented method, the aspects of the following description of an exemplary instantiation of the steps of 9.00 through 9.18 will specify a human user (hereinafter, "the user") interacting and partially directing the activity of the viewing system 108 to generate and transmit the exemplary first request message REQ.MSG.001. It is understood that other preferred embodiments would in practice generate additional request messages REQ.MSG.002-REQ.MSG.N in interaction with one or more humans and/or information technology processes.

In step 9.00 the viewing system 108 powers up and prepares to accept instructions from the user. In step 9.02 the viewing system 108 initializes the first request message REQ.MSG.001 and writes into the first request message REQ.MSG.001 the library network address LB.ADDR as the destination address and the instant viewing system network address NT.ADDR as the sender address. In step 9.04 the viewing system 108 determines if the user is directing the inclusion of any microskill identifiers MS.ID.001-MS.ID.N into the first request message REQ.MSG.001 and, if so finding, writes the indicated or provided microskill identifiers MS.ID.001-MS.ID.N into the first request message REQ.MSG.001 in step 9.06. In the instance of the first request message REQ.MSG.001, the fourth microskill identifier MS.ID.004 and the $811^{th}$ microskill identifier are added to the first request message REQ.MSG.001 in the instant execution of step 9.06

The viewing system 108 proceeds from either step 9.04 or step 9.06 on to execute step 9.08.

In step 9.08 the viewing system 108 determines if the user is directing the inclusion of any content identifiers NF.ID.001-NF.ID.N into the first request message REQ.MSG.001, and if so finding, writes the indicated or provided content identifiers NF.ID.001-NF.ID.N into the first request message REQ.MSG.001 in step 9.10. The sixth content identifiers NF.ID.006 added in the case of the first request message REQ.MSG.001. The viewing system 108 proceeds from either step 9.08 or step 9.10 on to execute step 9.12.

In step 9.12 the viewing system 108 determines if the user is directing the inclusion of any characteristic identifiers AUD.001-AUD.N into the first request message REQ.MSG.001, and if so finding, writes the one or more indicated or provided characteristic identifiers AUD.001-AUD.N into the first request message REQ.MSG.001 in step 9.14. In the instance of the first request message REQ.MSG.001, the 854th characteristic identifier AUD.001 is added to the first request message REQ.MSG.001 in the instant execution of step 9.14

The viewing system 108 proceeds from either step 9.12 or step 9.14 on to execute step 9.16 and to transmit the first request message REQ.MSG.001 to the library system 106, whereby the first request message REQ.MSG.001 may be received and/or detected by the library system in step 2.16 and therefrom processed and acted upon in step 2.18 through 2.30.

The viewing system 108 proceeds from step 9.16 to step 9.18 and to perform alternate computational operations, to include possibly generating and additional request message REQ.MSG.001-REQ.MSG.N.

Figure 10:
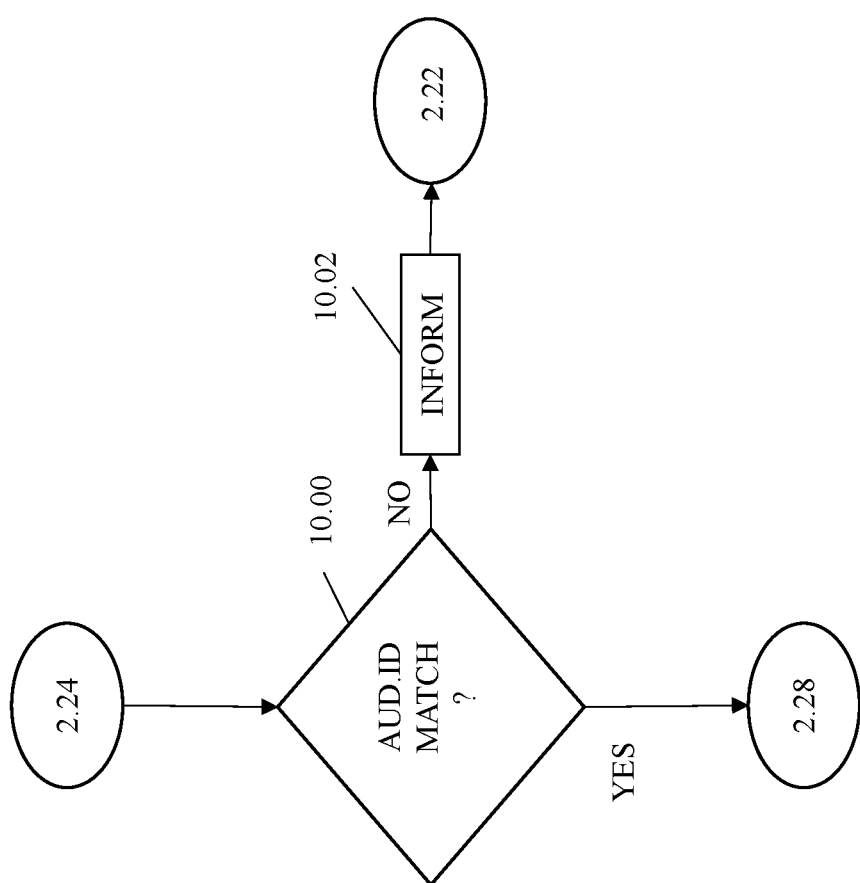
FIG. 10 is a flowchart of optional aspects of the first method of FIG. 2 as implemented by a library system or a viewing system optionally as directed by a user or an additional information technology process with a user and optionally in concert with the network of FIG. 1.

It is understood that in certain still other alternate preferred embodiments of the invented method, that first request message may be both generated by aspects of the method of FIG. 9 and applied by some or all aspects of the method of FIG. 2 and/or FIG. 10.

Referring now generally to the Figures and particularly to FIG. 10, FIG. 10 is a flowchart of optional aspects of the first method of FIG. 2 as implemented by a library system or a viewing system optionally as directed by a user or an additional information technology process with a user and optionally in concert with the network of FIG. 1. In the optional method of FIG. 10, the library system 106 proceeds from step 2.24 to step 10.00 an attempt to match a characteristic identifier AUD.001-AUD.N of a received request message REQ.MSG.001-REQ.MSG.N with a model record data MDL.DATA.001-MDL.DATA.N of one or more model records MDL.REC.001-MDL.REC.N.

If no match is found between an examined request message REQ.MSG.001-REQ.MSG.N and at least one model record MDL.REC.001-MDL.REC.N in step 10.00, the library system 106 proceeds on to execute optional step 10.02 or step 2.22. In optional step 10.02 the library system 106 communicates and informs a user or the viewing system 108 of this failure to find a match between one or more characteristic identifiers AUD.001-AUD.N of the instant received request message REQ.MSG.001-REQ.MSG.N with even one model record data MDL.DATA.001-MDL.DATA.N of one or more model records MDL.REC.001-MDL.REC.N.

In an alternative outcome to step 10.00, if a match is found between an examined request message REQ.MSG.001-REQ.MSG.N and at least one model record MDL.REC.001-MDL.REC.N in step 10.00, the library system 106 proceeds on to step 2.28.

It is understood that as the exemplary first request message REQ.MSG.001 is filtered through steps 2.18, 2.24, 2.28 and optional step 10.00, that the first model record MDL.REC.001 and the 111$^{th}$ model record MDL.REC.111 would be selected as matching the selection criteria of the first request message REQ.MSG.001, whereupon, the first model record MDL.REC.001 and the 111$^{th}$ model record MDL.REC.111, or the first model data MDL.DATA.001 and the 111$^{th}$ model data MDL.DATA.111, and/or pointers, addresses and or pointers thereto, are downloaded or streamed via the network 100 to one or more viewing systems 106.

It is understood in certain even other alternate preferred embodiments of the invented method, that the logic of optional step 2.24 is applied only to model records MDL.REC.001-MDL.REC.N that are found in step 2.18 to comprise at least one microskill identifier also referenced in the same and instant REQ.MSG.001-REQ.MSG.N.

It is further understood that the logic of optional step 2.24 is optionally applied only to model records MDL.REC.001-MDL.REC.N that are additionally found in step 10.00 to comprise at least one characteristic identifier AUD.001-AUD.N that is also referenced in the same and instant REQ.MSG.001-REQ.MSG.N.

It is understood that in various alternate preferred embodiments of the method of the present invention that the library system 106 may further comprise some or all of the aspects and elements of one or more of the viewing systems 108, wherein one or all of the steps and aspects of the methods of the Figures are performable and executed by the library system 106. It is understood that in other various alternate preferred embodiments of the method of the present invention that one or more viewing systems 108 may further comprise some or all of the aspects and elements of the library system 106, wherein one or all of the steps and aspects of the methods of the Figures are performable and executed by the instant viewing system 108.

Figure 11:
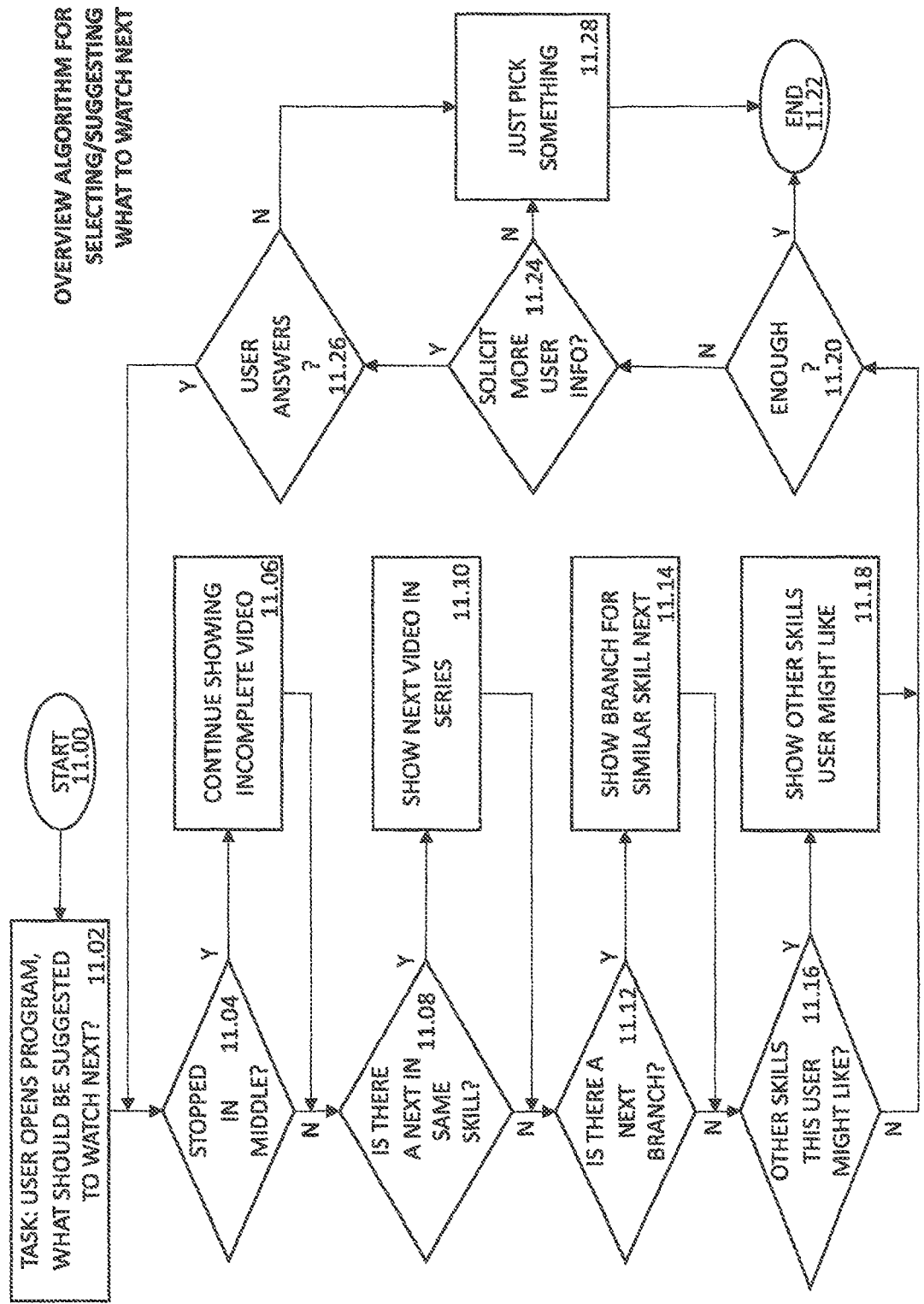
FIG. 11 is a flowchart of additional optional aspects of the first method of FIG. 2 for selecting microskill clips to present next, as implemented by a library system or a viewing system optionally as directed by a user or an additional information technology process with a user and optionally in concert with the network of FIG. 1.

Referring now to the Figures and particularly to FIG. 11, FIG. 11 is a process chart representing an overview of a possible algorithm for determining what microskill content a user should be shown next. This might be to set up offering of a panel of recommended videos for the user to select from, or simply selecting what to line up next in an 'autoplay' feature. It is noted that all of the following may pertain to rendering and presentation of microskill video content as stored and indexed in model records MDL.REC.001-MDL.REC.N and presented by the library system 106 and/or viewing system 108, all as previously discussed, to a user utilizing these elements for learning, self-education, education of others, or similar. At step 11.00, the process starts. By step 11.02, the situation is that the user has initiated the software DEV. SW of the viewing system 108, and is looking for a microskill to watch; and the task addressed in this process chart is to offer the user a next microskill to watch, preferably a good suggestion, suited to the user's skill level and interests as understood by the program. In step 11.04, it is determined whether this user was already in the middle of a microskill video, such as if this same user was already watching a microskill video then cut the video off in the middle; the user's device ran out of battery, or the user paused the video and never resumed, for whatever reason. It is noted that if several users pause the same video in about the same place and never resume, it may be an indication of a software problem, or an indication that said video is boring and predictably runs out the attention span of most people halfway through, and therefore tracking such usage may be useful to an administrator or provider of this system and content for further optimization. If there is an incomplete video available to continue, in step 11.06, it may be recommended or suggested that the user continue from where their previous session left off, like picking up a book and continuing from one's bookmarked page. In the absence of this case, the software may recommend that the user continue to the next microskill clip relevant to what the user is currently learning, based either on a manually-set intention or on what the user just watched or has been watching. For example, if the user has been watching a microskill video or videos on basic painting, the user may be interested in next viewing a microskill video for the next higher difficulty level of painting, so their development can progress linearly. If this is the case, in step 11.10, this available next video is suggested or offered to the user. Otherwise, if the obvious, linear skill progression is exhausted, this budding painter may be interested in one or more branches of this skillset, such as progressing into oil painting, or watercolors, or color mixing, or any number of subdivisions within the overall discipline of painting. If these are on offer in step 11.12, in step 11.14 the user may be offered one or more of these as a next track to follow. It is noted that, depending on the interface design, a user may be offered multiple, branching options to select from, may be offered one option at a time to accept or decline, may be offered the 'most relevant' selection next as a default or 'auto-play' unless the user declines and chooses something else, or in certain embodiments, the session of videos may be pre-curated or pre-selected by another user and the end user actually learning the material gets only one predetermined 'next option'. It is noted that this process for determining what to offer the user next is not exclusive; having a next linear step in a current curriculum doesn't preclude also offering the user other options in similar areas alongside the most obvious option. Besides a clear 'next level' or 'next category' of painting to work on, the user may be interested in trying photography next, or drawing, or some other visual arts skill; similarly, an archer may also be interested in sharpshooting, or a sewing student may also like to try some embroidery. This may be a more logical progression, from painting to sculpting, say, or from sewing to embroidery, than providing a completely random suggestion for a next skill to try. If step 11.16 finds a suggestion like this available, the user may be offered this in step 11.18. It may be the case that, by this point, the software has plenty of options to offer the user already; this is determined in step 11.20, and if so, the process ends and the user may be offered a menu to select from, a recommendation for a next watch, an autoplayed next video, or similar, depending on the interface. If it is determined that there aren't enough options already being offered to the user, such as for instance a case in which it's a brand-new user and no preferences have been established yet so no specific recommendations can be made, the program may ask the user a few questions, such as what the user is interested in learning about, how deep into that subject the user would like to get, how much the user knows already, or other information about what kind of user this is that might be used to recommend what the user may be interested in learning about. If it's not indicated that the program should ask the user such questions in step 11.24, or if the user declines to answer in step 11.26, then the program may just select something random to offer the user in step 11.26, and suggest that microskill in step 11.22. Otherwise, if new information about the user has been provided, the process may start over again so more can be recommended in view of the new information. It is noted that inclusion of Artificial Intelligence algorithms, such as analysis of user viewing patterns or recommendations based on what a similar user found useful, may also be applicable here.

Figure 12A:
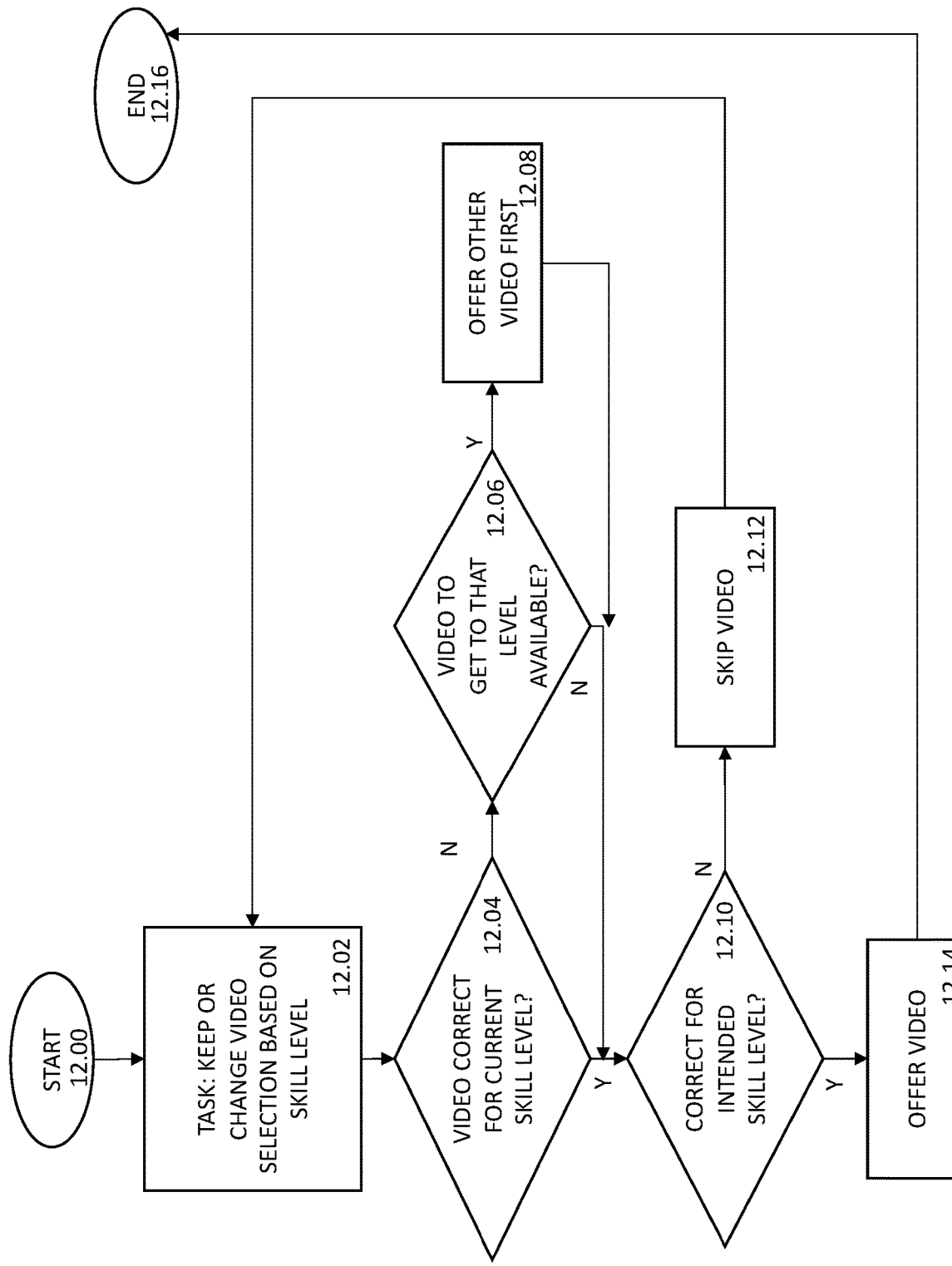
FIG. 12A is a process chart presenting further additional optional aspects of the first method of FIG. 2 for selecting microskill clips to present next, as implemented by a library system or a viewing system optionally as directed by a user or an additional information technology process with a user and optionally in concert with the network of FIG. 1.

Referring now to the Figures and particularly to FIG. 12A, FIG. 12A is a process chart for adjusting a next video selection for a user's current skill level and intended skill level, as disclosed by the user or as discerned based on view history. For instance, a beginner painter may be interested in learning a particular advanced-level brush stroke technique; the following process determines what intermediate step(s) might be inserted there, such that the beginner-level user isn't simply 'thrown into the deep end', but can first learn the other microskills the user may need first in order to learn that brush stroke successfully. It is noted that all of the following may pertain to rendering and presentation of microskill video content as stored and indexed in model records MDL.REC.001-MDL.REC.N and presented by the library system 106 and/or viewing system 108, all as previously discussed, to a user utilizing these elements for learning, self-education, education of others, or similar. In step 12.00, the process of FIG. 12A as executed by the library system 106 begins. By step 12.02, the task is set of determining whether to substitute or insert a preliminary microskill first in order to provide a better foundation for learning the currently selected microskill. In step 12.04, it is determined whether the currently selected video is appropriate for the user's current skill level as understood by the program, based on factors such as self-reporting by the user or watch history. If not, in step 12.06, it is determined whether there is a second video available to supply whatever preliminary knowledge the user may be lacking. If so, in step 12.08 the program may offer this second video first, to 'build up' to learning the user's intended skill. It is noted that if the original selected skill is very much beyond the abilities of the current user, steps 12.04-12.08 may build up several levels of recursion, such that the user watches a sequence of clips generated to get the user up to speed, to the point of being able to learn the advanced technique. Next, just because the video is 'easy enough' for the user, doesn't mean the video is relevant to the skill level the user is trying to get to; this is determined at step 12.10, and if the video isn't relevant, the video may be skipped at step 12.12. Otherwise, if the video is correct for the current skill level and correct for the intended skill level, the video is offered at step 12.14. The process ends at step 12.16.

Figure 12B:
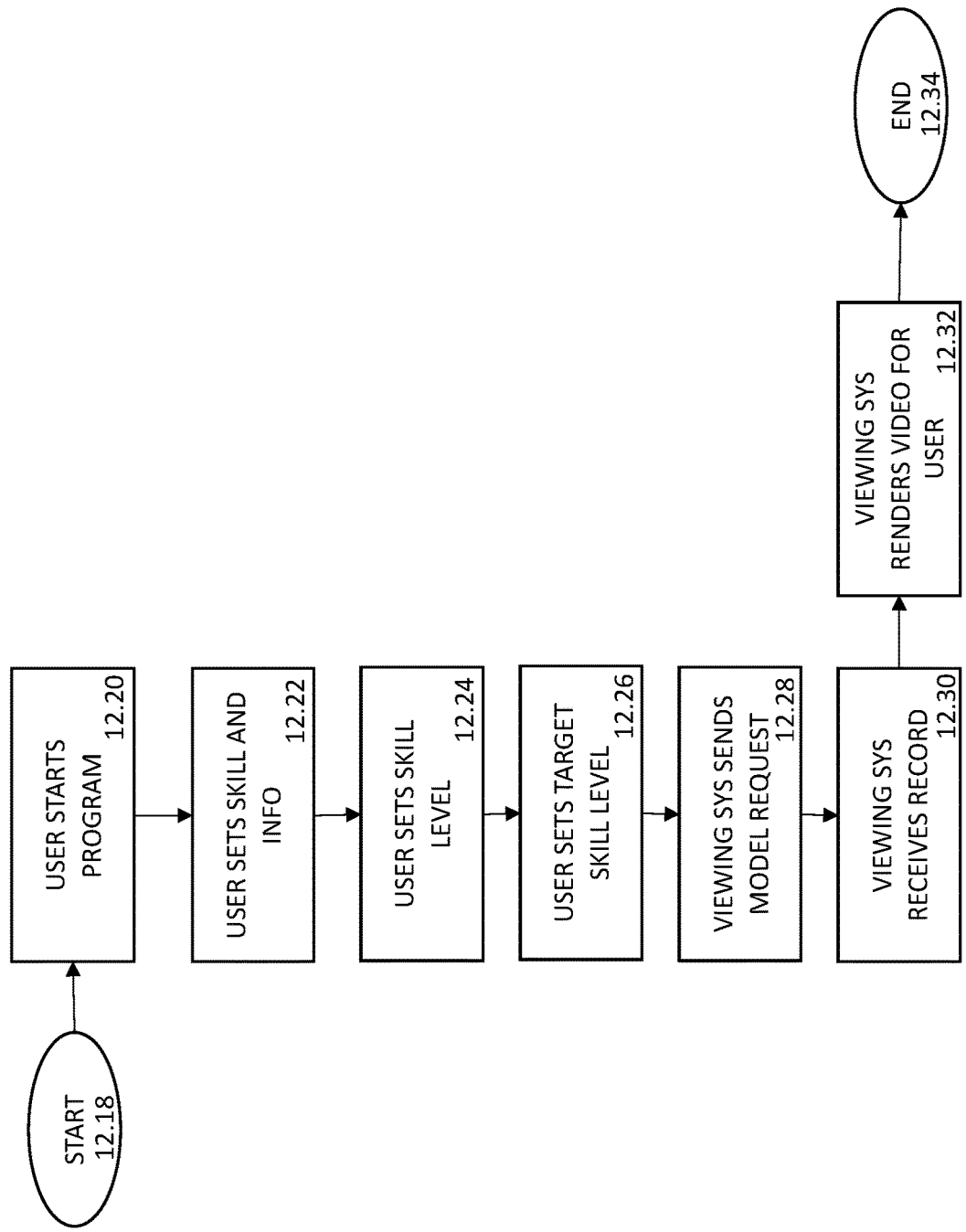
FIG. 12B is a process chart presenting a selection by a user of options pertaining to a viewing request, and receipt and rendering of a record by the viewing device.

Referring now generally to the Figures and particularly to FIG. 12B, FIG. 12B is a process chart presenting a selection by a user of options pertaining to a viewing request, and receipt and rendering of a record by the viewing system 108. For instance, a user may power on a computing device used as the viewing system 108 or start up a program, and be asked questions or select settings options regarding what kind of training the user would like to receive; the viewing system 108 may access local memory or communicate remotely with the library system 106 in order to obtain a model record MDL.REC.001-N suited to the user's request or settings, and render the video of this record for the user to view. The process of FIG. 12B as executed by the viewing system 108 begins at step 12.18. In step 12.20, the user initiates the program of the viewing system 108; this may be by starting up a software application, powering on a device, or any other such means known in the art. In step 12.22, the user may identify a skill to develop or a body of information to learn, such that the viewing system 108 may identify which microskill identifier MS.ID.001-N and information identifier NF.ID.001-N to request. In step 12.24, the user may set a current skill level MS.LVL.001-N as a representation of the user's current level of expertise or ability in the previously selected skill identified by the microskill identifier MS.ID.001-N. In step 12.26, the user may set a target skill level MS.TGT.001-N as a representation of the skill level towards which the user would like to progress. It is noted that, in some cases, the user may not necessarily provide all of these available input values, or may be asked for or provide additional input along with the items specifically stated in this Figure. Gathering of these pieces of information may allow the viewing system 108 or the library system 106 to better select a microskill video that will be relevant to the user. Once the viewing system 108 has the data fields of the request REQ.MSG.001-N populated with this information, including filling in some logistical fields automatically such as the local address, the address of the server, and so on, in step 12.28, the viewing system 108 may send the request REQ.MSG.001-N to the library server 106. It is noted that in embodiments where the library is stored locally on the viewing system 108, no remote request may be necessary and the viewing system 108 may process the gathered data locally instead. In step 12.30, the viewing system 108 receives in response to the request REQ.MSG.001-N one or more records MDL.REC.001-N which include one or more microskill videos as part of the record data MDL.DATA.001-N to be rendered for viewing by the user. In step 12.32, the viewing system 108 renders the received data MDL.DATA.001-N videos for the user. In step 12.34, the process ends.

Referring now to the Figures and particularly to FIGS. 13A through 13E, FIGS. 13A through 13E present an example 'pipeline' of modules consisting of grouped video materials for learning art-related skills, the 'traversal path' of which may vary depending on one's current and intended mastery levels in art-related skills. It is noted that all of the following may pertain to rendering and presentation of microskill video content as stored and indexed in model records MDL.REC.001-MDL.REC.N and presented by the library system 106 and/or viewing system 108, all as previously discussed, to a user utilizing these elements for learning, self-education, education of others, or similar. It is understood that the included examples are not intended to be complete or comprehensive, but rather to present enough of an example of this concept to paint a picture and make the described concepts accessible. In the first example of FIG. 13A, the example 1300 consists of a plurality of modules 1302-1338, a statement 1340 showing starting skill level (such as having "No experience", as in FIG. 13A) and target skill level (such as mastery of "Basic drawing"). This plot is further labeled by difficulty, with modules 1302-1338 toward a left side 1342 being easier, and modules 1302-1338 more toward a right side 1344 being more advanced or difficult. Individual modules 1302-1338 are further tagged with difficulty level, in this image, by the letters "B" for beginner, "I" for intermediate, and "A" for advanced. It is noted that these represented module 1302-1338 examples are not necessarily reflective of any actual curriculum or media that actually exists; this is an example designed for explanatory purposes. The modules 1302-1338 of FIGS. 13A-13E may represent one or a plurality of microskill model records MDL.REC.001-MDL.REC.N.

The individual example modules 1302-1338 of FIGS. 13A through 13E include a "Basic Drawing #1" module 1302, a "Basic Drawing #2" module 1304, an "Intermediate Drawing #1" module 1306, an "Intermediate Drawing #2" module 1308, an "Advanced Drawing #1" module 1310, an "Advanced Drawing #2" module 1312, a "Composition" module 1314, a "Color Theory" module 1316, a "Basic Digital Media" module 1318, a "Basic Art History" module 1320, an "Intermediate Art History" module 1322, a "Basic Painting" module 1324, an "Intermediate Painting" module 1326, a "Comic Book Drawing" module 1328, a "Basic Drafting" module 1330, an "Intermediate Drafting" module 1332, a "Basic Photography #1" module 1334, a "Basic Photography #2" module 1336, and a "Basic Photography #3" module 1338. It is further noted that each of these modules may further consist of multiple microskill tracks as presented in FIG. 14; the scale of the examples of FIGS. 13A-13E is intended to represent how the relationships between different topics and areas of study may interact and overlap in designing of a 'study path' for mastery in a given subject such as painting or drawing.

Figure 13A:
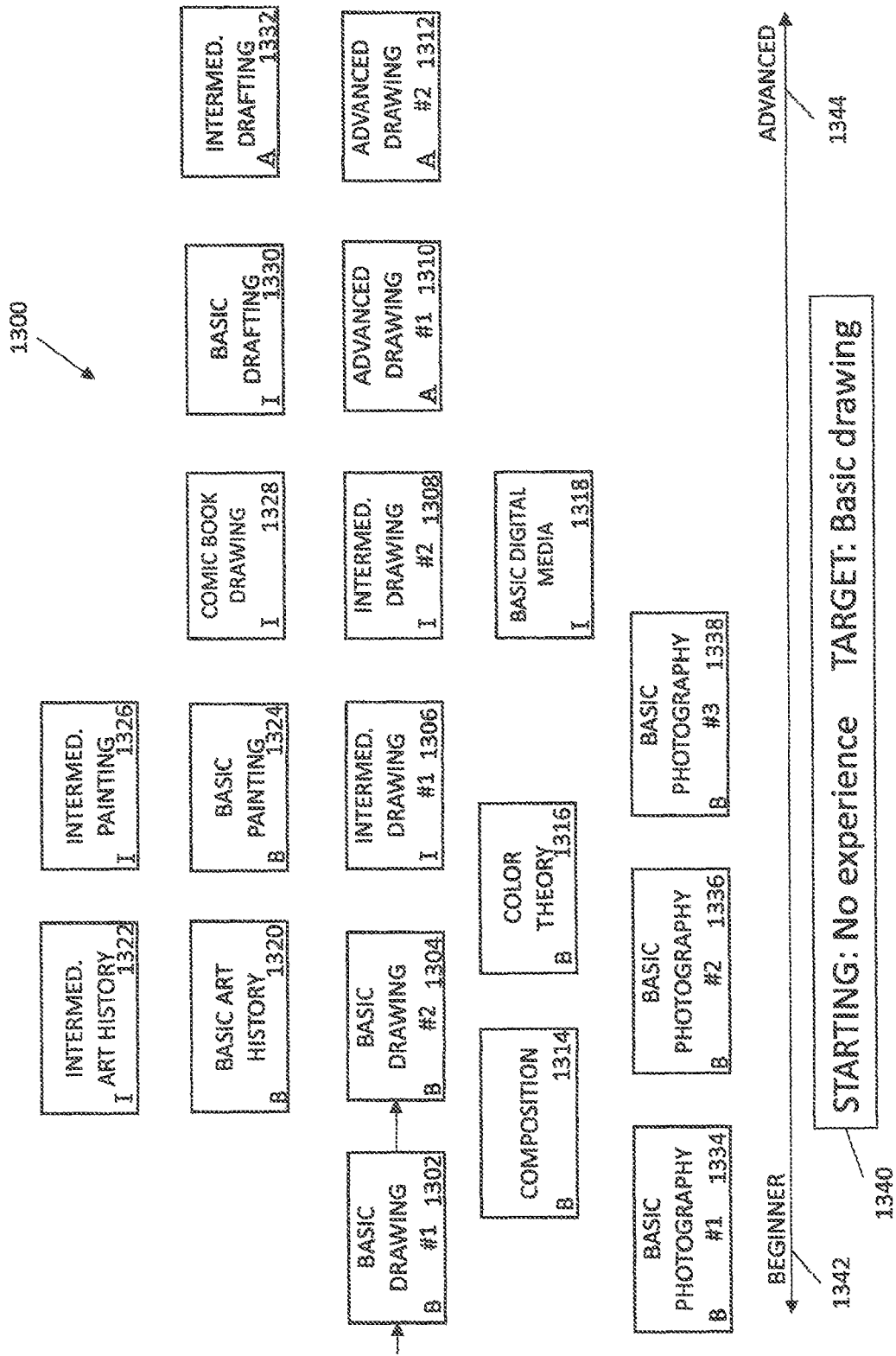
FIG. 13A is a first example representation of multiple interrelated fields of learning which may be taught by the microskill library system of FIG. 3, demonstrating how a user may traverse multiple of these fields in developing a single skill, depending on the user's intended mastery level.
Figure 13B:
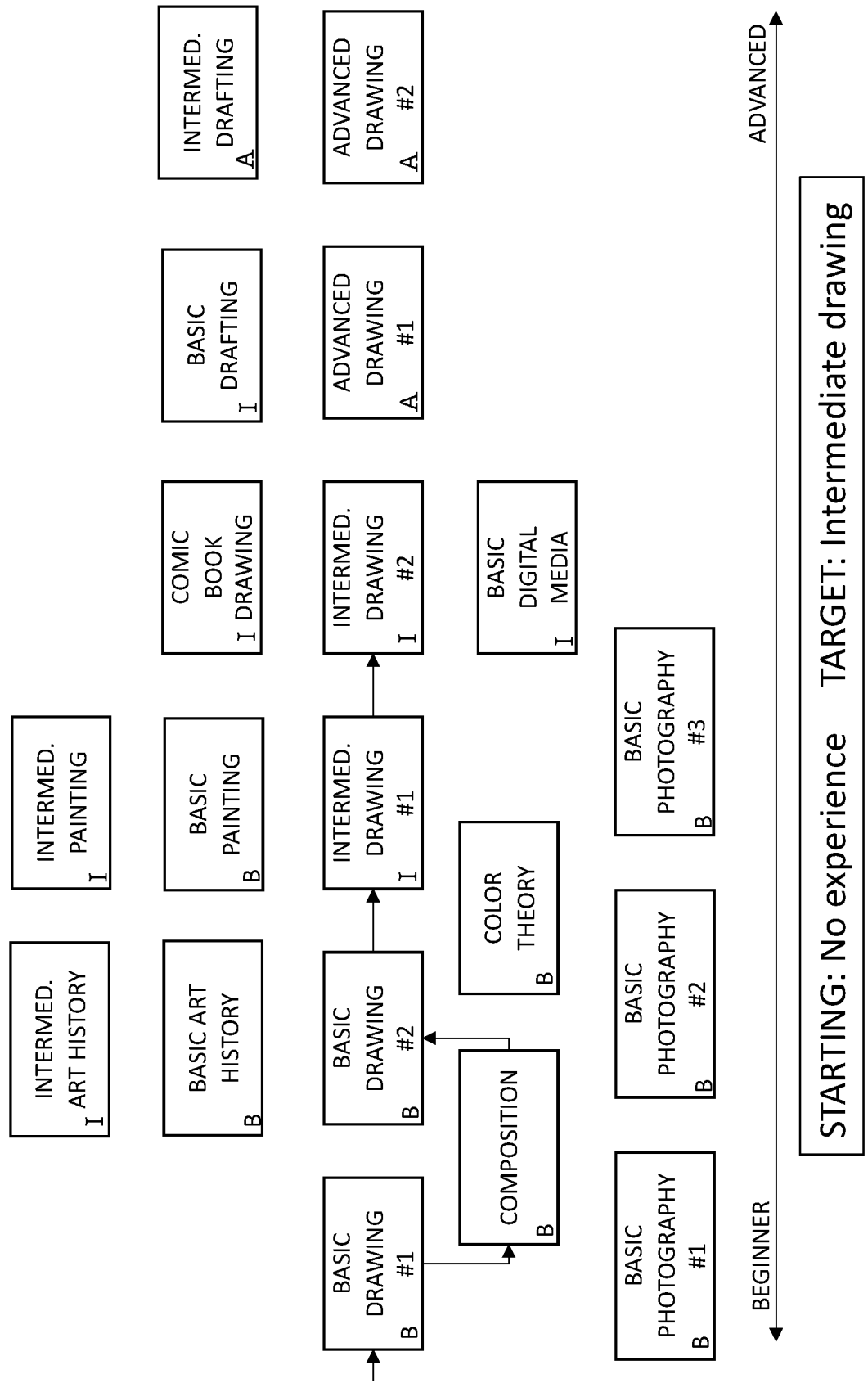
FIG. 13B is a second example in the established context of FIG. 13A, demonstrating how a user may traverse multiple of these fields in developing a single skill, depending on the user's intended mastery level.

The example of FIG. 13A is fairly straightforward, and mostly presented for contrast with the later, more complex paths of FIGS. 13B-13E. In this example, as the statement 1340 indicates, a user has no drawing experience, and would like to learn basic drawing. This path may only consist of modules pertaining to basic drawing itself, as presented here through arrows, without incorporating other concepts which might be more appropriate to include if one is aiming for eventual mastery in a subject. Contrast especially the example of FIG. 13B, which starts at No Experience and aims for Intermediate Drawing, and incorporates Composition for an incrementally more well-rounded education in the skill of drawing, up to a higher mastery level than the example of FIG. 13A. Skills and concepts that can be taught as part of 'the basics' to expand the breadth as well as the depth of the skill knowledge being built are sometimes not relevant to people interested in only learning 'the basics enough to be functional', the way these topics would be relevant to those aiming for competition-level, professional-level, or mastery-level skill in the subject.

Figure 13C:
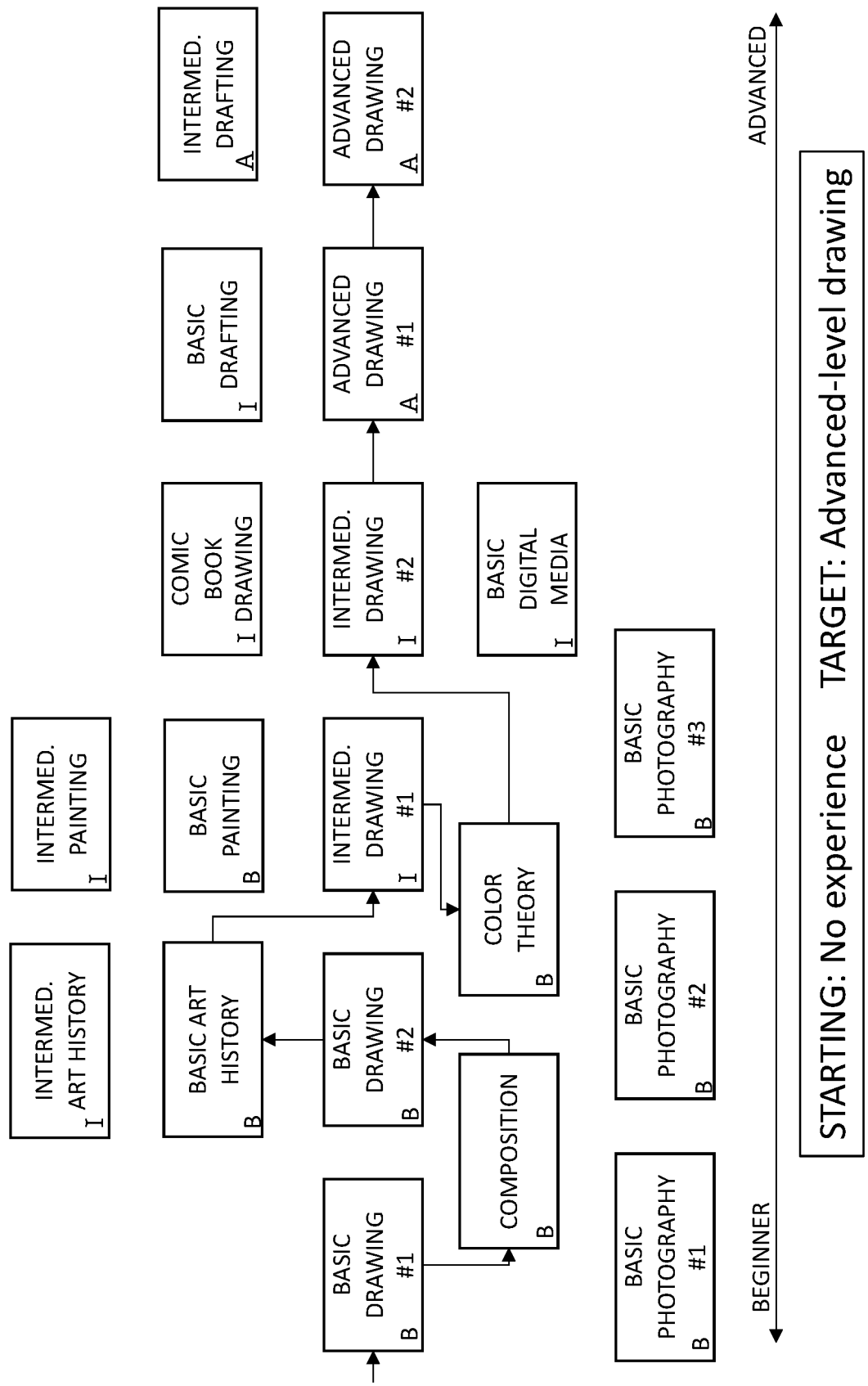
FIG. 13C is a third example in the established context of FIG. 13A, demonstrating how a user may traverse multiple of these fields in developing a single skill, depending on the user's intended mastery level.

The example of FIG. 13C presents a path formulated for someone with no drawing skill, who would like to become an expert at drawing. This path, contrasted with the paths aiming for basic drawing of FIG. 13A or aiming for intermediate drawing of FIG. 13B, incorporates still more 'detours' expanding the breadth of related basic and intermediate skill imparted to the aspiring artist in related areas that might be of interest to someone training to be an expert-level artist in a drawing medium, such as art history, color theory, and the basics of composing and publishing art in a digital medium. It is again emphasized that this example is not comprehensive or meant to accurately portray what an expert art teacher may consider most relevant to a student with similar ambitions; in actual implementation, an expert opinion might be really valuable to formulate this aspect, but in this instance, only the concept is under discussion and the example is intended as a hypothetical environment in which to explain how the concept may be applied, with example, hypothetical fields of study indicated to make the explanation clearer and more intuitive.

Figure 13D:
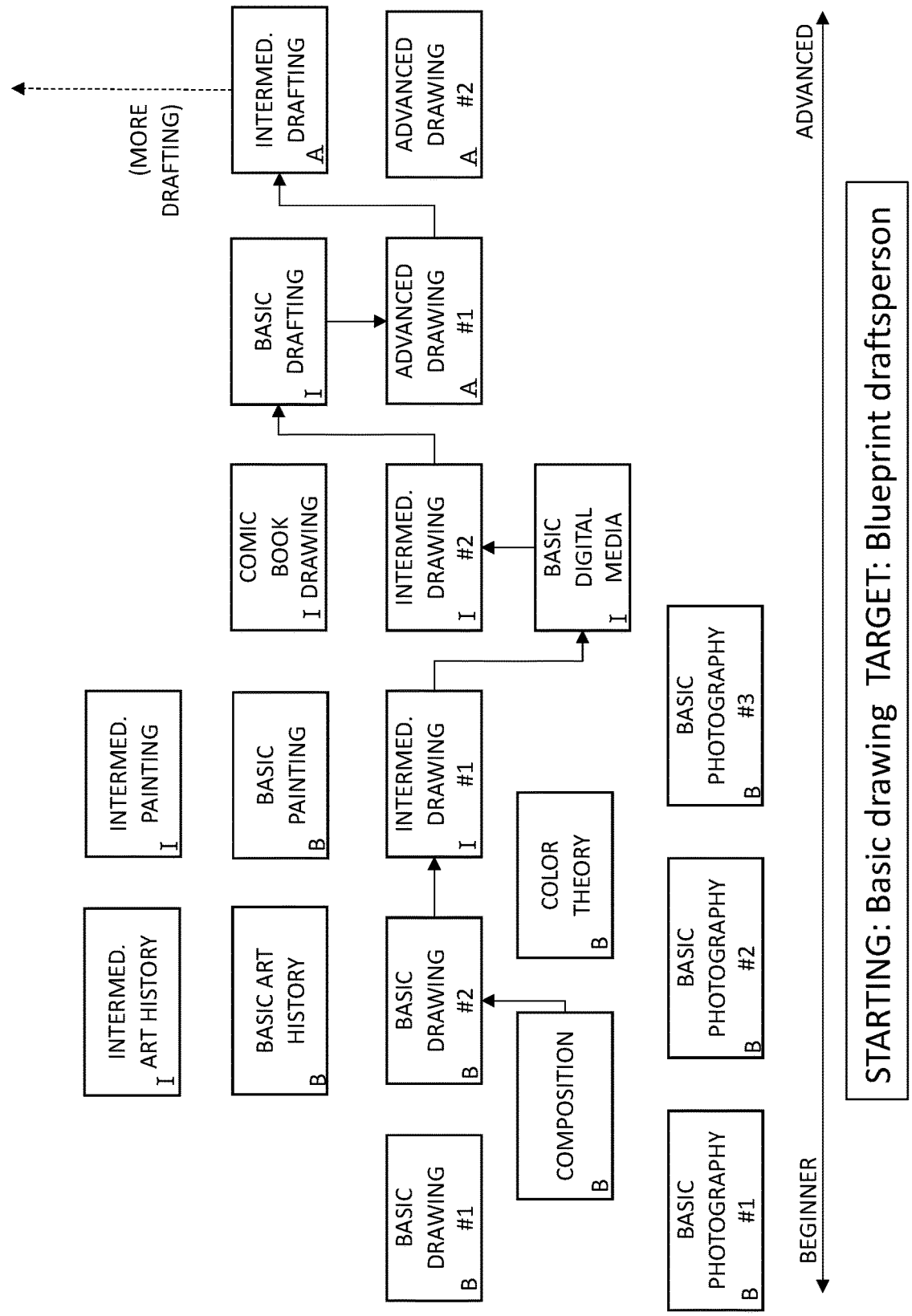
FIG. 13D is a fourth example in the established context of FIG. 13A, demonstrating how a user may traverse multiple of these fields in developing a single skill, depending on the user's intended mastery level.

Regarding the example of FIG. 13D, in this example a user starting with some basic drawing experience is seeking to develop that basic competence into a skillset suited to being a professional draftsperson, such as a professional drafter of blueprints. In this hypothetical path, it may be suggested to start with some visual composition and review a few later drawing basics before launching into intermediate drawing, detouring to digital media (such as for some AutoCAD or other digital drafting tools), and raising drawing skill level overall alongside skills particular to drafting. It is noted that, since the example is centered around drawing, there may be more drafting modules that aren't shown here but are understood to exist 'out of frame'. The path depicted here may be viewed as the portion of an aspiring draftperson's trajectory that overlaps with that of someone training in drawing and related skills, and that trajectory may continue off into more 'drafting-specific territory' from here.

Figure 13E:
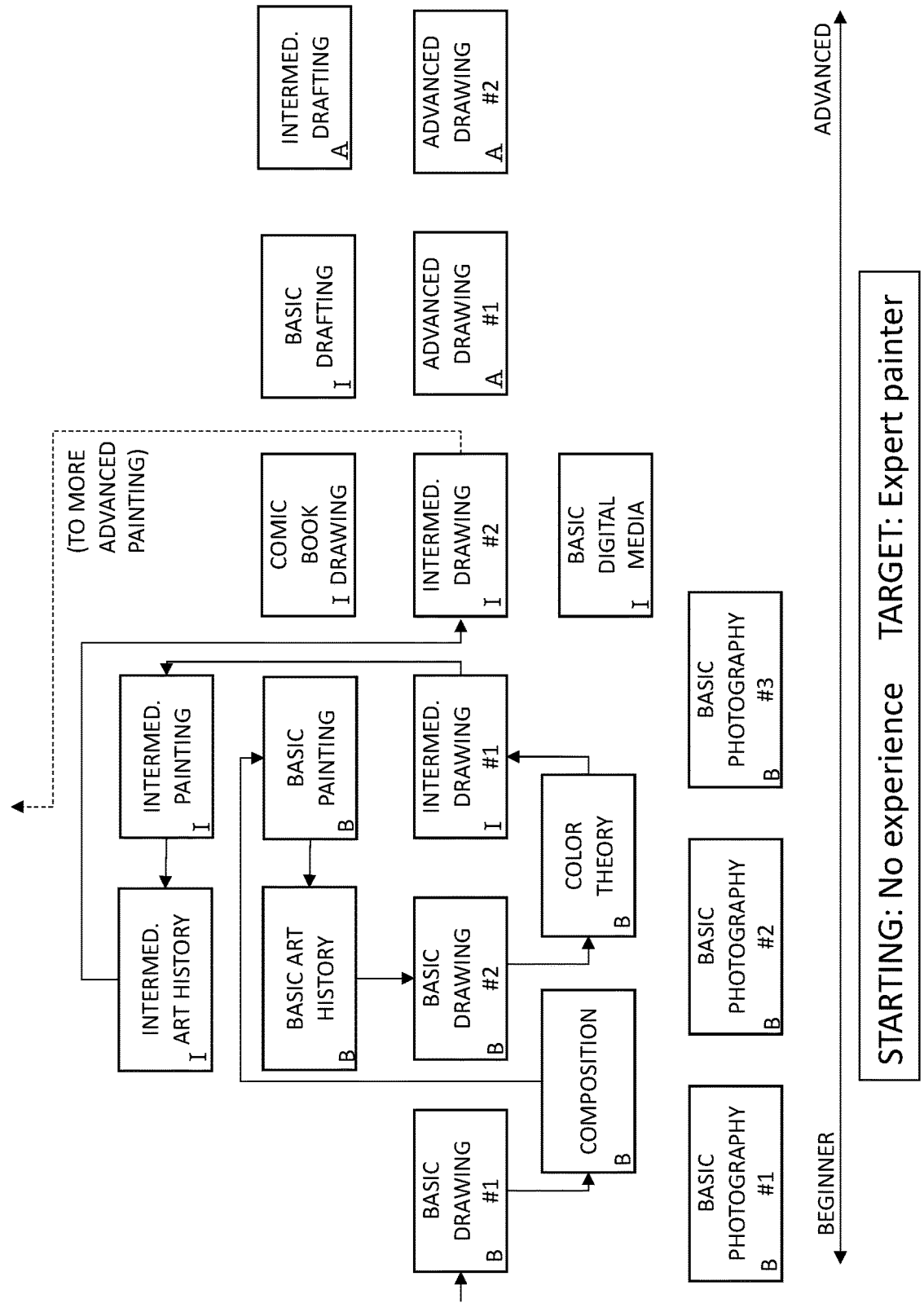
FIG. 13E is a fifth example in the established context of FIG. 13A, demonstrating how a user may traverse multiple of these fields in developing a single skill, depending on the user's intended mastery level.

Regarding the example of FIG. 13E, this is an example scenario in which someone with no experience sets out to become a painter of masterpieces. Like any respectable art curriculum, this may start with some drawing. Again, it should be emphasized that this is hypothetical for demonstration and not the curriculum an expert might design, and also that this example centers around drawing-related skills, which may serve as a foundation for learning painting, but don't encompass everything one might be able to learn about painting; the trajectory of this master painter, like the draftsperson of FIG. 13D, continues 'off the edge' of the present example into further levels of expertise particular to the relevant discipline. In this example, the first microskills shown are in the Basic Drawing #1 module 1302, moving on to some composition, then incorporating some beginner-level painting, some fundamental art history, some more advanced (though still basic) drawing, color theory, intermediate drawing, intermediate painting, intermediate art history, more intermediate drawing, and so on. One significant advantage here is the ability to provide a broad foundation of knowledge in disciplines interrelated with the discipline in which one seeks mastery, such as art history and drawing for a painter, and interweave building of that knowledge base with learning more and more (in this case) painting.

Figure 14:
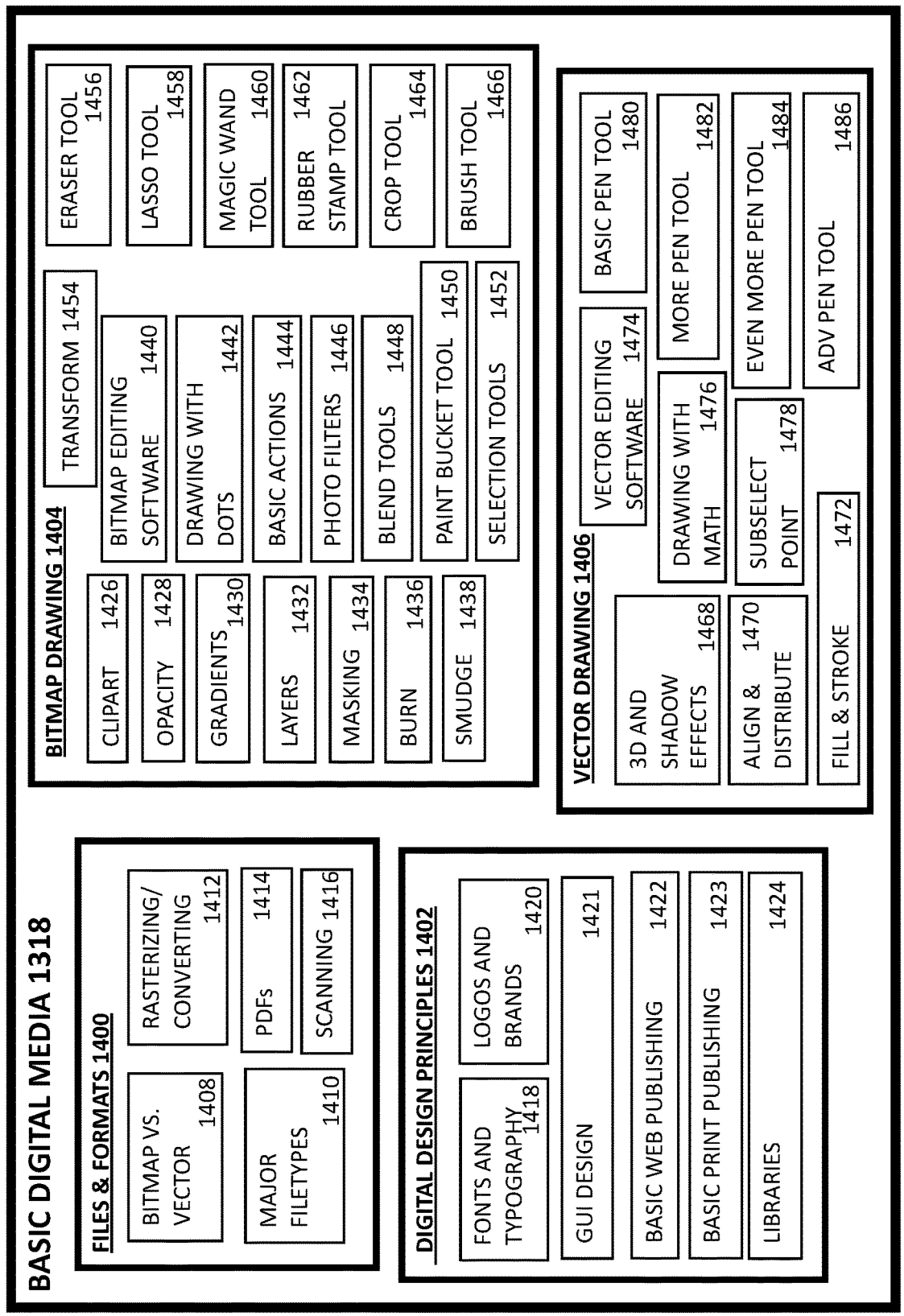
FIG. 14 is a representation of the "Basic Digital Media" module of FIG. 13A, presenting a hypothetical example of further, microskill-level granularity as instantiated within any single one of the modules of FIG. 13A.

Referring now to the Figures and particularly to FIG. 14, FIG. 14 is a further granulated example of one of the example sections presented in FIGS. 13A-13E, namely the Basic Digital Media Section 1318. It is noted that all of the following may pertain to rendering and presentation of microskill video content as stored and indexed in model records MDL.REC.001-MDL.REC.N and presented by the library system 106 and/or viewing system 108, all as previously discussed, to a user utilizing these elements for learning, self-education, education of others, or similar. It is understood that the example presented here may not encompass all aspects of even basic digital media as known and practiced by a professional in the art, but representation of individual, granular topics may allow better comprehension of the concept of microskills generally. The example of FIG. 14 should be viewed as indicative of the extent to which each module 1302-1330 depicted in FIGS. 13A-13E should be viewed as a macrocosm grouping of a collection of microskill videos, each with a duration of perhaps a couple minutes at most, which present single skills, concepts, or techniques with atomic granularity: for example, a single brushstroke technique, a drawing technique for shading, or a concise concept explanation.

Needless to say, some of the example microskill tracks 1408-1486 presented here might be further expanded upon in additional microskill tracks, but this is, after all, only Basic Digital Media. Even an 'analog' artist, such as a sketch artist, painter, or draftsperson, may want to know some of these basics, so the artist can publish or advertise their art online to best effect, use computers to show an image to a colleague, or maybe branch out and dabble in some computer-based drawing tools also. Further modules regarding digital media may include AutoCAD and similar, for draftspeople, or may branch off into webpage design, video game graphics, print media, digital animation, generating graphs with spreadsheet software, Adobe CreativeSuite, presentation slide show design, standard Office software drawing tools, and so on. As with every art, there's a whole world to discover, of which this, though a densely-packed visual, is only a small and incomplete representative sampling.

The example tracks of FIG. 14 are grouped into a Files and Formats section 1400, a Digital Design Principles section 1402, a Bitmap Drawing section 1404, and a Vector Drawing section 1406. The individual example microskill tracks include a "Bitmap vs. Vector" microskill track 1408, a "Major Filetypes" microskill track 1410, a "Rasterizing/Converting" microskill track 1412, a "PDFs" microskill track 1414, a "Scanning" microskill track 1416, a "Fonts and Typography" microskill track 1418, a "Logos and Brands" microskill track 1420, a "GUI Design" microskill track 1421, a "Basic Web Publishing" microskill track 1422, a "Basic Print Publishing" microskill track 1423, a "Libraries" microskill track 1424, a "Clipart" microskill track 1426, an "Opacity" microskill track 1428, a "Gradients" microskill track 1430, a "Layers" microskill track 1432, a "Masking" microskill track 1434, a "Burn" microskill track 1436, a "Smudge" microskill track 1438, a "Bitmap Editing Software" microskill track 1440, a "Drawing With Dots" microskill track 1442, a "Basic Actions" microskill track 1444, a "Photo Filters" microskill track 1446, a "Blend Tools" microskill track 1448, a "Paint Bucket Tool" microskill track 1450, a "Selection Tools" microskill track 1452, a "Transform" microskill track 1454, a "Eraser Tool" microskill track 1456, a "Lasso Tool" microskill track 1458, a "Magic Wand Tool" microskill track 1460, a "Rubber Stamp Tool" microskill track 1462, a "Crop Tool" microskill track 1464, a "Brush Tool" microskill track 1466, a "3D and Shadow Effects" microskill track 1468, an "Align & Distribute" microskill track 1470, a "Fill & Stroke" microskill track 1472, a "Vector Editing Software" microskill track 1474, a "Drawing With Math" microskill track 1476, a "Subselect Point" microskill track 1478, a "Basic Pen Tool" microskill track 1480, a "More Pen Tool" microskill track 1482, an "Even More Pen Tool" microskill track 1484, and an "Advanced Pen Tool" microskill track 1486. It is noted that the microskill tracks 1408-1486 may each comprise or include the video content associated with the model records MDL.REC.001-MDL.REC.N.

It is noted that a student of drawing or painting might only be recommended a few of these microskill tracks 1408-1486 as part of their painting or drawing track, while a student draftsperson or photographer may be recommended a few different ones. For instance, a student of digital photography may be less interested in learning about vector drawing, but will need to know about photo filters, print and web publishing, and file storage formats just to begin with.

It is noted that the order in which the microskill tracks 1408-1486 happen to be numbered is not necessarily indicative of any recommendable run order. A microskill as instantiated in microskill tracks 1408-1486 across all difficulty levels might have the same core skill steps, with additional steps added in as the difficulty levels increase and further nuance is introduced. Each microskill track 1408-1486 may be further tagged for difficulty level, so users could search by difficulty level. Different mastery levels for a single microskill may be applied or modeled in different, increasingly challenging situations or scenarios, such as the multiple "Pen Tool" tracks 1480-1486 of the example of FIG. 14 offering a progression from basic use to more expertise and finesse with a tool the use of which is in itself a skill. Further, which microskill tracks 1408-1486 are included in one's 'path' or 'web' of self-training will vary depending on the level of mastery one may specify, such as becoming an expert painter, or attaining a minimal level of drafting qualification for a profession, or successfully taking up photography as a hobby. It is noted that a user might be 'guided' on the path selected based on their skill level and intended mastery goal by way of suggested content, auto-play functions, or similar. In some instances, the user may be able to select differently and disregard the recommendation of the next video on that 'path'; in others, such as a formal training program designed by an administrator or similar, the administrator may select and also be suggested sequences of microskill tracks 1408-1486 ahead of time, and may have options regarding 'locking in' or limiting the end user's available content options or sequence. It is noted that, similar to the examples of FIGS. 13A-E, these various microskill tracks 1408-1486 may be curated into a sequence appropriate for the user's field of study, including omitting some which aren't relevant, repeating others as relevant or as indicated, and reordering based on the user's interests or the other skills being taught.

Figure 15:
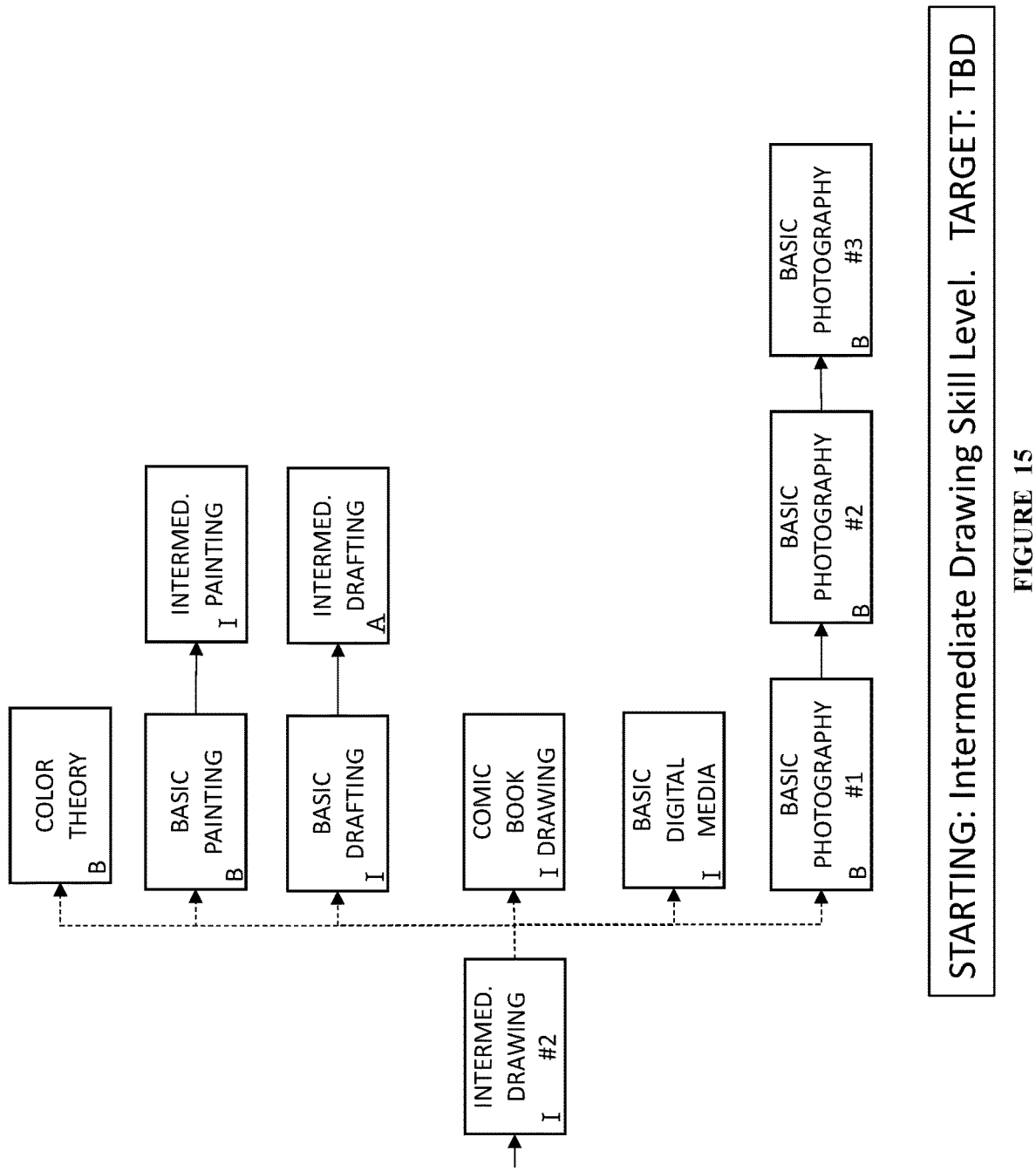
FIG. 15 is a representative example of how selectable or recommended skill pathways may branch and vary, within the established context of FIG. 13A.

Referring now to the Figures and particularly to FIG. 15, FIG. 15 is an example of how proficiency in one area or module may open up a branching menu of options for a next area of learning. For instance, a user who recently learned intermediate drawing might progress to color theory (if this hasn't already been covered), may try their hand at painting or drafting or photography, or might start comic book drawing, or learn some digital media skills. Naturally, this is not an exhaustive list, and regardless of what someone has just mastered, that person may take on anything next; nothing is stopping this proficient sketcher from taking up bowling or scuba diving next. However, there is a lot to recommend the benefits of a branching web of different fields of study, such that it's just a short leap, and not a random one, to find one's next hobby or level of development. It is noted that incorporation of Artificial Intelligence technology such as machine learning would be ideal in this application, providing a higher sophistication and degree of relevance to the program's suggestions or recommendations such as through analyzing or suggesting 'crowdsourced' patterns of study as pursued by other similar users.

Figure 16:
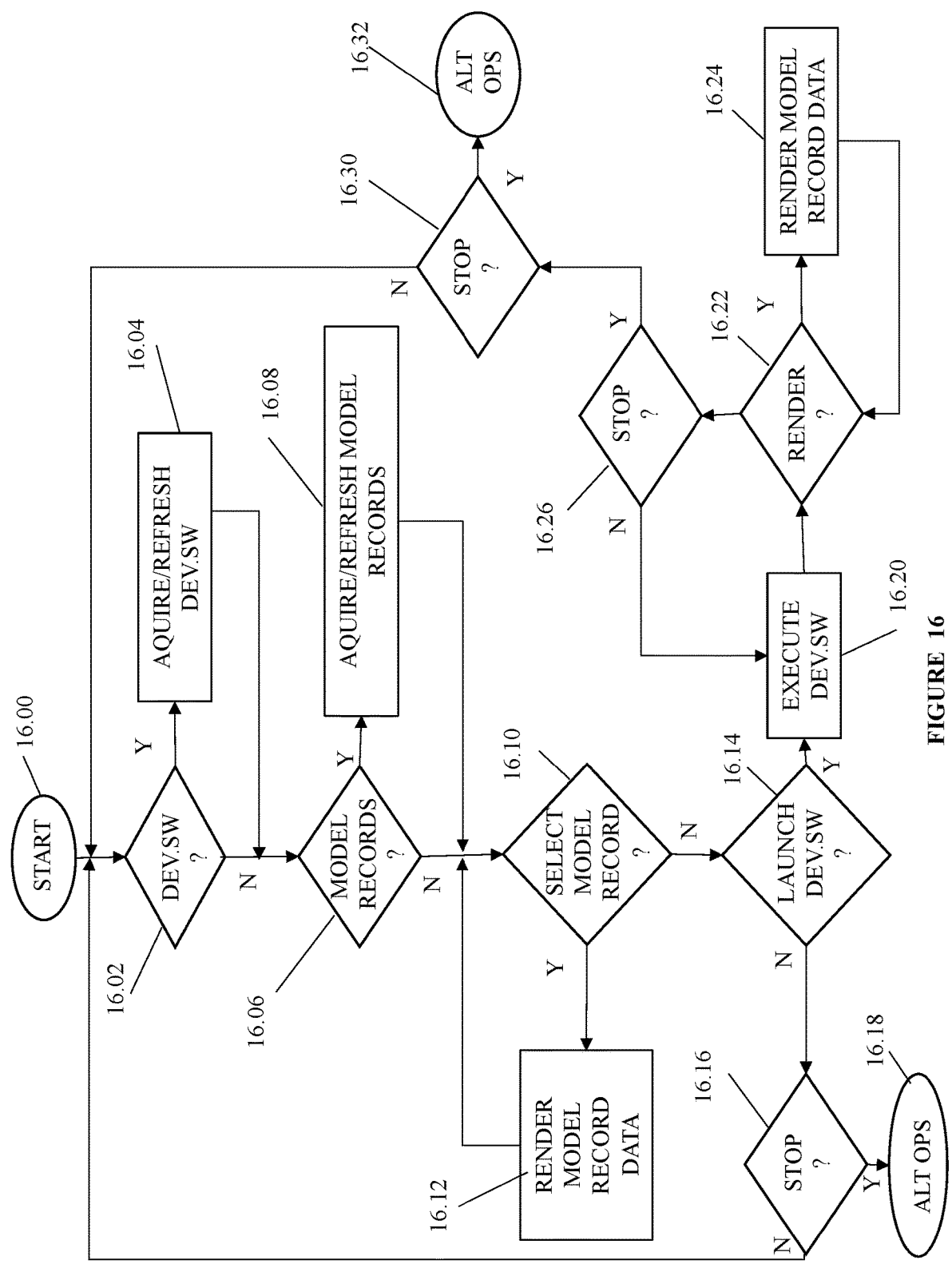
FIG. 16 is a flow chart presenting a process for downloading and utilizing the device software and database records of FIG. 3 on a viewing system of FIG. 1.

Referring now generally to the Figures and particularly to FIG. 16, FIG. 16 is a flow chart presenting a process for downloading and utilizing the device software and database records of FIG. 3 on one of the viewing systems 108 or the library system 106 of FIG. 1. In step 16.00, the process of FIG. 16 as executed by one of the viewing systems 108 or the library system 106 begins. In step 16.02, it is determined whether the device software DEV. SW is present, or whether the device software DEV. SW requires downloading or updating. If so, in step 16.04, the device software DEV.SW is downloaded, installed, and/or updated. In step 16.06, it is determined whether the collection of the model records MDL.REC.001-MDL.REC.N stored on the viewing system 108 is present and up to date. If not, in step 16.08, one or more files are downloaded to get or update the stored model records MDL.REC.001-MDL.REC.N. At step 16.10, it is determined whether to select one of the model records MDL.REC.001-MDL.REC.N. If so, the model record data is rendered in step 16.12. Else, in step 16.14, tit is determined whether to launch the device software DEV. SW. If not, it in step 16.16, it is determined whether to stop. If so, the device may proceed to other operations in step 16.18. If launching the device software was indicated in step 16.14, in step 16.20 the device software DEV. SW is executed. In step 16.22, it is determined whether to render. If so, in step 16.24, the model record data of the model record(s) MDL.REC.001-MDL.REC.N. is rendered. If not, it is determined whether to stop at step 16.26. If so, it is determined whether to stop at step 16.30. If so, the device may proceed to other operations at step 16.32.

It is noted that the viewing system 108 may be or comprise a computer device such as a desktop computer, laptop, tablet, or smart device being used as a playback or streaming device by a user learning something, but may also comprise a device utilized by an administrator to select microskill records MDL.REC.001-MDL.REC.N to recommend or require a user to view, such as a teacher assigning microskill viewing selections to students as homework. In this case, the teacher may have access to the full library, but curate certain sessions of video viewing for students, which may then be further curated by the student's device in some embodiments, such as by presenting these in an order and selection suited to the student's particular skill level and interests while still operating within the boundaries set already by the teacher. This is just one potential application and benefit of the invented technology, mentioned for purposes of clarity, and should not be construed as limiting.

Figure 17:
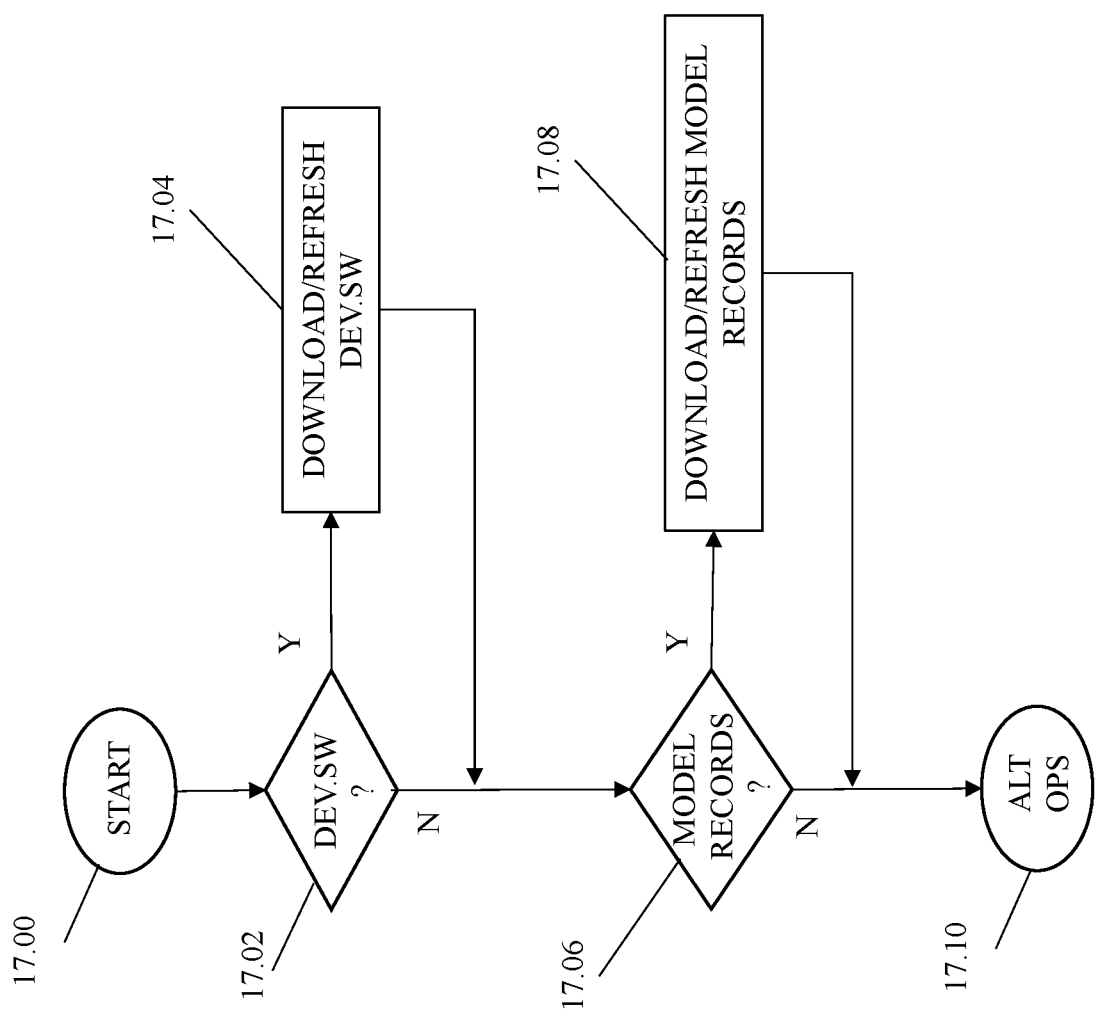
FIG. 17 is a flow chart for synchronizing or refreshing the device software and database records of FIG. 3 on a viewing system of FIG. 1.

Referring now generally to the Figures and particularly to FIG. 17, FIG. 17 is a flow chart for synchronizing or refreshing the device software and database records of FIG. 3 on the viewing system 108 of FIG. 1. In step 17.00, the process as executed on one of the viewing systems 108 of FIG. 1 begins. In step 17.02, it is determined whether the device software DEV.SW is present, or whether the device software DEV. SW requires downloading or updating. If so, in step 17.04, the device software DEV.SW is downloaded, installed, and/or updated. In step 17.06, it is determined whether the collection of the model records MDL.REC.001-MDL.REC.N stored on the viewing system 108 is present and up to date. If not, in step 17.08, one or more files are downloaded to get or update the stored model records MDL.REC.001-MDL.REC.N. Once these updates are complete, the system is ready to move onto further alternate operations, in step 17.10.

Figure 18:
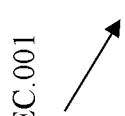
FIG. 18 is a block diagram of an exemplary first user record as stored within the library system of FIGS. 1, 2 and 3.

Referring now generally to the Figures and particularly to FIG. 18, FIG. 18 is a block diagram of the exemplary first user record USR.REC.001 that includes a first user record identifier USR.REC.ID.001 and a first user identifier USR.ID.001. The first user identifier USR.ID.001 is applied in certain preferred embodiments of the present invention to associate the information of the comprising first user record USR.REC.001 with a particular user ("the first user"). The first user record USR.REC.001 further comprises a first user profile USR.PROF.001 and a plurality of model record identifiers MDL.ID.002-MDL.ID.N. The first user profile record USR.PROF.001 that contains information that identify or describe various of aspects of the first user, to include preferences, choices, online behavior, offline behavior, history and qualities associated with the first user referenced by the first user identifier USR.ID.001. The plurality of model identifiers MDL.ID.002-MDL.ID.N denote model records MDL.REC.002-MDL.REC.N that the first user has previously accessed.

Figure 19:
FIG. 19 is a block diagram of a first user record library as stored within the library system of FIGS. 1, 2 and 3, wherein the first user record library stores the exemplary first user record and a plurality of additional user records of FIGS. 1 and 18.

Referring now generally to the Figures and particularly to FIG. 19, FIG. 19 is a block diagram of the first user record library USR.LIB.001 that includes the plurality of user records USR.REC.001-USR.REC.N that each preferably contain a user identifier and, in and in each instance of each user record USR.REC.001-USR.REC.N. information associated with the user referenced within the same user record USR.REC.001-USR.REC.N as described in relation to the first user record REC.REC.001 by the textual description of the Figures and particularly FIG. 18. It is understood that the first user record library USR.LIB.001 may be stored in whole or in part in the library system 106 or distributed within the network 100.

Figure 20:
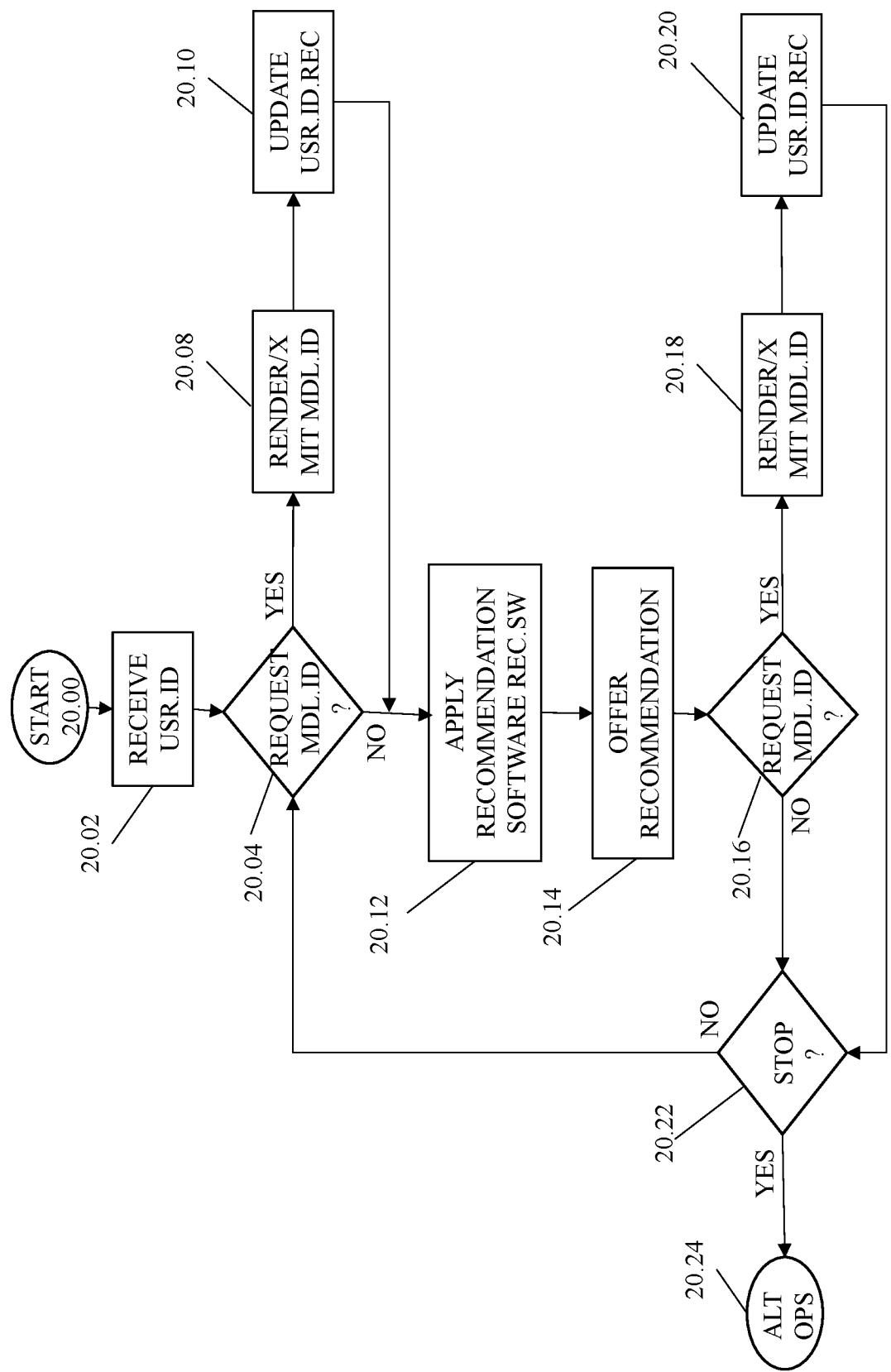
FIG. 20 is a flowchart of an exemplary artificial intelligence method of providing suggestions to a user of video models to render via the library system of FIGS. 1, 2 and 3 and/or the viewing system and the network of FIG. 1.

Referring now generally to the Figures and particularly to FIG. 20, FIG. 20 is a flowchart of an exemplary artificial intelligence method (hereinafter "the AI method") of providing suggestions to a user of video models to render via the library system 106, the viewing system 108 and the network 100. In step 20.00 the library system 106 powers up and receives a user identifier USR.ID.001-USR.N from the viewing system 208 via the network 100 in step 20.02. In step 20.04 the library system 106 determines whether a model record identifier MDL.ID.001-MDL.ID.N has been received from the viewing system 208 via the network 100.

When the library system 106 determines in step 20.04 that a model record identifier MDL.ID.001-MDL.ID.N has been received from the viewing system 208 via the network 100, the library system 106 proceeds on to step 20.08 and transmits the MDL.REC.001-MDL.REC.N requested in step 20.04 and proceeds on to step 20.10. In step 20.10 the library system 106 updates the user record USR.REC.001-USR.REC.N identified by the user record identifier USR.ID.001-USR.ID.N received in step 20.02 to record that the MDL.REC.001-MDL.REC.N transmitted in step 20.08 has been accessed. The library system 106 proceeds on from step 20.10 to step 20.12.

It is understood that when the library system 106 determines in step 20.04 that a model record identifier MDL.ID.001-MDL.ID.N has not been received from the viewing system 208 via the network 100, the library system 106 proceeds on to step 20.12.

In step 20.12 the library system 106 applies the recommendation software REC.SW to generate a recommendation of a video model record MDL.REC.001-DL.REC.N to be viewed by the user referenced by the user identifier USR.ID.001-USR.ID.N received in step 20.2. It is understood that in step 20.12 the recommendation software REC.SW accesses the user records USR.REC.001-USR.REC.N and applies one or more of suitable aspects of artificial intelligence and/or content selection as known in the art in view of the user record USR.REC.001-USR.REC.N identified by the user record identifier USR.ID.001-USR.ID.N received in step 20.02, and/or applies one or more of suitable aspects of artificial intelligence of the patent documents incorporated by reference in the present disclosure.

In step 20.14 the library system provides video model identifier MDL.ID.001-MDL.ID.N of the video model record MDL.REC.001-MDEL.REC.N selected in step 20.12.

In step 20.16 the library system 106 determines whether the viewing system 108 requests a model record MDL.REC.001-MDL.REC.N. When the library system 106 determines in step 20.16 that the viewing system 108 requests a MDL.REC.001-MDL.REC.N, the viewing system 108 in step 20.1 transmits the MDL.REC.001-MDL.REC.N requested in step 20.16 and in step 20.20 updates the user record USR.REC.001-USR.REC.N identified by the user record identifier USR.ID.001-USR.ID.N received in step 20.02 to record that the MDL.REC.001-MDL.REC.N transmitted in step 20.18 has been accessed. The library system 106 proceeds from step 20.20 to step 20.22.

In step 20.22 the library system 106 determines whether to proceed back to step 20.04 and to execute and additional sequence of steps 20.04 to step 20.22, or in the alternative to proceed on to alternate computational and/or communications process in step 20.24

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

One or more of the aspects or steps, optional or essential, invented method may be implemented as software, firmware, hardware, module or engine. In one embodiment, the previous invented method description may be implemented by the general-purpose processor CPU 106A in the library system 106 to achieve the previously desired functions. In one embodiment, the invented method may be implemented as an engine or module which may include modules as subcomponents. In other embodiments, features of one or more of the described subcomponents may be combined or partitioned into different individual components, modules or engines.

Those of skill in the art would understand that information and signals might be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a compact disc read only memory (CD- ROM), digital versatile disc (DVD), or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in data processing device containing hardware (e.g., hardware), software (e.g., the device software DEV.SW), a firmware, e.g., the device firmware DEV.FW, or any combination thereof. If implemented in software as a computer program product, the functions or modules may be stored on or transmitted over as one or more instructions or code on a computer-readable media (e.g., non-transitory machine-readable storage medium). Computer-readable media can include both computer storage media and communication media including any medium that facilitates transfer of a computer program from one place to another. A storage media may be any available media that can be accessed by a computer, or data processing device/system. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method for generating modular microskills training sessions comprising:
    assigning a unique information identifier to each of a plurality of unique information elements in a one-to-one correspondence;
    selecting a plurality of microskills to be modeled for observation by a user;
    assigning a unique microskill identifier of a plurality of microskill identifiers to each microskill in a one-to-one correspondence;
    digitizing a plurality of video models, wherein each digitized video model ("video model") records a demonstration of at least one microskill;
    assigning at least one user skill level selected from a plurality of user skill levels to each video model;
    assigning a desired skill level selected from a plurality of desired skill levels to each video model;
    receiving a user request to select at least one video model, the request including specifying a first microskill identifier, a first user skill level of the plurality of user skill levels and a first desired level of the plurality of skill levels;
    selecting at least one video model having been assigned the first microskill identifier and both the first user skill level and the first desired skill level; and
    rendering to the user the at least one video model meeting the selection criteria of having been assigned both the first user skill level and the first desired skill level.

2. The method of claim 1, wherein the rendering the at least one video model is performed by means of user interaction over an electronics communications network.

3. The method of claim 1, wherein selecting a first group of video models is at least partially derived from an audience characteristic assigned to an intended audience associated with the user.

4. The method of claim 1, wherein no two video models of the plurality of video models are assigned a same microskill identifier.

5. The method of claim 1, further comprising: assigning a first information identifier to the at least one video model; receiving in the user request a second filter designation to select at least one video model associated with the first information identifier; and selecting at least one video model having been assigned both the first user skill level and the first desired skill level and the first information identifier.

6. The method of claim 5, wherein no two video models of the plurality of video models are assigned a same microskill identifier.

7. The method of claim 5, wherein no two video models of the plurality of video models are assigned a same information identifier.

8. The method of claim 5, further comprising selecting a linear microskills sequence of microskill identifiers and rendering a first group of video models in the linear microskills sequence in the presence of the user.

9. The method of claim 1, further comprising selecting a sequence of microskill identifiers and rendering a first group of video models in the order of the selected sequence of microskill identifiers.

10. The method of claim 1, further comprising:
    assigning a unique information identifier to each of a plurality of information elements;
    assigning at least one information identifier to at least two video models of the plurality of video models;
    selecting a sequence of information identifiers; and
    rendering a first group of video models selected from the plurality of video models in the order of the selected sequence of information identifiers.

11. The method of claim 1, further comprising associating a related network addresses with the plurality of video models, wherein a selected related network address is selectively applied by the user to access additional information.

12. The method of claim 1, further comprising associating a plurality of related network addresses with the first group of video models, wherein each related network address is selectively applied by the user to access additional information.

13. A method for generating modular microskills training sessions comprising:
- assigning a unique information identifier to each of a plurality of unique information elements in a one-to-one correspondence;
- selecting a plurality of microskills to be modeled for observation by a user;
- assigning a unique microskill identifier of a plurality of microskill identifiers to each microskill in a one-to-one correspondence;
- digitizing a plurality of video models, wherein each digitized video model ("video model") records a demonstration of at least one microskill;
- assigning a first microskill identifier to at least one video model of the plurality of video models; assigning a first information identifier to the at least one video model;
- receiving a request to select at least one video model to which both the first microskill identifier is assigned and the first information identifier is assigned;
- rendering to the user the at least one video model meeting the selection criteria of having been assigned the first microskill identifier and the first information identifier; and
- downloading to a viewing system a device software that enables the viewing
- system to instantiate the aspects of claim 1 in interaction with the user.

14. The method of 13, further comprising downloading at least a first plurality of the plurality of video models to an alternate computational system via network.

15. The method of claim 13, further comprising downloading at least a second plurality of the plurality of video models to the viewing.

16. The method of claim 13, further comprising downloading the plurality of video models to the viewing system.

17. The method of claim 13, wherein the viewing system to transfers a copy of at least one video model of the plurality of video models via the network as directed by the device software in interaction via the network to a second viewing system.

18. The method of claim 13 wherein at least a first plurality of the plurality of video models are transferred to a third viewing system.

19. A database management system, comprising:
- a processor comprising hardware; and a transient persistent memory storing a device software adapted to update a first database with information received via an electronic communications network and the memory further storing executable instructions that, when executed by the processor, direct the database management system to perform operations comprising:
- assigning a unique information identifier to each of a plurality of unique information elements in a one-to-one correspondence;
- selecting a plurality of microskills to be modeled for observation by a user;
- a unique microskill identifier of a plurality of microskill identifiers to each microskill in a one-to-one correspondence; digitizing a plurality of video models, wherein each digitized video model ("video model") records a demonstration of at least one microskill;
- assigning at least one user skill level selected from a plurality of user skill levels to each video model;
- assigning a desired skill level selected from a plurality of desired skill levels to each video model;
- receiving a user request to select at least one video model, the request including specifying a first microskill identifier, a first user skill level of the plurality of user skill levels and a first desired level of the plurality of skill levels;
- selecting at least one video model having been assigned the first microskill identifier and both the first user skill level and the first desired skill level; and rendering to the user the at least one video model meeting the selection criteria of having been assigned both the first user skill level and the first desired skill level.

20. The database management system of claim 19, wherein the computer memory storing the plurality of video models bi-directionally coupled to the processor via the electronic communications network.

* * * * *